United States Patent
Wong et al.

(10) Patent No.: US 7,411,583 B1
(45) Date of Patent: Aug. 12, 2008

(54) OPTICAL SENSOR BASED USER INTERFACE FOR A PORTABLE ELECTRONIC DEVICE

(75) Inventors: Yoon Kean Wong, Menlo Park, CA (US); William Robert Hanson, Mountain View, CA (US)

(73) Assignee: Palm, Inc., Sunnyvale, CA (US)

( * ) Notice: Subject to any disclaimer, the term of this patent is extended or adjusted under 35 U.S.C. 154(b) by 445 days.

(21) Appl. No.: 10/951,537

(22) Filed: Sep. 27, 2004

Related U.S. Application Data

(63) Continuation of application No. 09/871,375, filed on May 30, 2001, now Pat. No. 6,816,154.

(51) Int. Cl.
*G09G 5/08* (2006.01)

(52) U.S. Cl. ............... 345/175; 345/156; 345/158; 345/166; 345/173; 345/581; 382/276

(58) Field of Classification Search .......... 345/156, 345/157, 158, 165, 166, 173, 175, 581; 348/20; 382/276
See application file for complete search history.

(56) References Cited

U.S. PATENT DOCUMENTS

| | | | | |
|---|---|---|---|---|
| 4,345,148 | A | * | 8/1982 | Pines et al. ............. 250/214 C |
| 4,386,345 | A | | 5/1983 | Narveson et al. |
| 4,475,240 | A | * | 10/1984 | Brogardh et al. ............ 382/314 |
| 5,149,963 | A | * | 9/1992 | Hassler, Jr. ............. 250/227.21 |
| 5,177,802 | A | * | 1/1993 | Fujimoto et al. ............ 382/124 |
| 5,249,104 | A | * | 9/1993 | Mizobe ...................... 362/605 |
| 5,270,818 | A | | 12/1993 | Ottenstein |
| 5,283,432 | A | * | 2/1994 | McKillip .................... 250/229 |
| 5,306,908 | A | | 4/1994 | McConica et al. |
| 5,374,989 | A | | 12/1994 | Takemura et al. |
| 5,452,240 | A | | 9/1995 | Roca et al. |
| 5,502,459 | A | * | 3/1996 | Marshall et al. ............. 345/158 |
| 5,737,643 | A | * | 4/1998 | Kitagawa et al. .............. 396/55 |
| 5,760,773 | A | * | 6/1998 | Berman et al. ............. 715/808 |
| 5,886,308 | A | | 3/1999 | Ericson et al. |
| 5,900,863 | A | | 5/1999 | Numazaki |
| 5,926,780 | A | * | 7/1999 | Fox et al. .................... 702/142 |

(Continued)

OTHER PUBLICATIONS

Scanner as Optical Communication Port; IBM Tech Disclosure Bulletin, Dec. 1995, vol. No. 38, Issue No. 12, pp. 465-468.*

(Continued)

*Primary Examiner*—Bipin Shalwala
*Assistant Examiner*—Vince E Kovalick

(57) ABSTRACT

An apparatus and method are described herein, which simultaneously promotes a positive computing experience for users of portable computer systems and increases overall durability and longevity thereof. In one embodiment, an optical apparatus enhances the user computing experience, in one embodiment by simplifying operation, and is much more durable and long-lasting than mechanical switch and dial type devices it may replace. In one embodiment, the present invention is directed to an apparatus, which enables efficient portable computer device function, field, and data selection, gaming, input, interconnection, and other switching-related functions, simplifying operation and enhancing versatility thereof, yet without exposing the portable computer interior to any degree to incursion of environmental contamination. In one embodiment, an optical apparatus obviates openings in a portable computer package which would otherwise be required. In one embodiment, the apparatus, capable of sensing manipulation and directed by software, has a light source and corresponding light sensor.

19 Claims, 17 Drawing Sheets

U.S. PATENT DOCUMENTS

| | | | |
|---|---|---|---|
| 5,933,089 A | 8/1999 | Katada | |
| 5,952,992 A | 9/1999 | Helms | |
| 6,008,486 A | 12/1999 | Stam et al. | |
| 6,057,540 A | 5/2000 | Numazaki et al. | |
| 6,057,840 A | 5/2000 | Durrani et al. | |
| 6,088,025 A | 7/2000 | Akamine et al. | |
| 6,122,075 A * | 9/2000 | Yamada et al. | 358/446 |
| 6,153,876 A * | 11/2000 | Fujita et al. | 250/216 |
| 6,211,940 B1 | 4/2001 | Seagrave et al. | |
| 6,243,069 B1 | 6/2001 | Ogawa et al. | |
| 6,243,079 B1 | 6/2001 | Liu | |
| 6,256,016 B1 * | 7/2001 | Piot et al. | 345/166 |
| 6,278,443 B1 | 8/2001 | Amro et al. | |
| 6,287,193 B1 * | 9/2001 | Rehkemper et al. | 463/1 |
| 6,314,066 B1 * | 11/2001 | Hong et al. | 369/44.28 |
| 6,377,341 B1 | 4/2002 | Rowlen et al. | |
| 6,463,278 B2 | 10/2002 | Katada et al. | |
| 6,504,530 B1 * | 1/2003 | Wilson et al. | 345/173 |
| 6,535,190 B2 * | 3/2003 | Evanicky | 345/88 |
| 6,550,683 B1 * | 4/2003 | Augustine | 235/462.45 |
| 6,560,150 B2 | 5/2003 | Tsujii | |
| 6,590,547 B2 | 7/2003 | Mariconi et al. | |
| 6,590,564 B1 * | 7/2003 | McLoone et al. | 345/167 |
| 6,597,348 B1 | 7/2003 | Yamazaki et al. | |
| 6,718,115 B1 | 4/2004 | Gettemy et al. | |
| 6,762,741 B2 | 7/2004 | Weindorf | |
| 7,006,080 B2 | 2/2006 | Gettemy et al. | |
| 2001/0032121 A1 * | 10/2001 | Le | 705/14 |
| 2002/0158883 A1 | 10/2002 | Cheri et al. | |
| 2002/0163524 A1 | 11/2002 | Dutta | |
| 2004/0075637 A1 | 4/2004 | Izumi | |
| 2006/0279557 A1 | 12/2006 | Gettemy et al. | |

OTHER PUBLICATIONS

Web page showing product understood to be commercially available from Compaq, Inc., 1 page (http://www.compaq.com/products/handhelds/pocketpc/features.html).

*The Technolgy*, printed from website http://www.poasana.com/pstech.html, Feb. 18, 2002, 2 pages, coyright 2000 Poa Sana, Inc., 295 Kinney Drive, San Jose, Ca 95112.

*Inkwell System*, printed from website http://inkwellsystems.com/technical.htm, About Light Pens from Inkwell System-Technical Information, Nov. 27, 2001, 1 page, copyright 1997-2001, Inkwell Systems.

*Ethnentica and TactileSense*, Ethentica, White Paper, "Verified with Tactile Sense," Jun. 2000, 13 pages, Copyright 1997, 1998, 1999, 2000 by Ehentica, Inc., 100 North Pointe Drive, Lake Forest, CA 92639.

\* cited by examiner

OPTICAL SENSOR BASED USER INTERFACE FOR A PORTABLE ELECTRONIC DEVICE

RELATED U.S. PATENT APPLICATION

This Continuation application claims the benefit and priority to the commonly-owned Ser. No. 09/871,375, now U.S. Pat. No. 6,816,154, filed on May 30, 2001, by Wong et al., and entitled "Optical Sensor Based User Interface For a Portable Electronic Device," which is incorporated herein by reference.

BACKGROUND OF THE INVENTION

1. Field of the Invention

The present invention relates to the field of portable electronic devices such as personal digital assistants or palmtop computer systems. Specifically, the present invention relates to an apparatus and method for utilizing an optical sensor based user interface for registering user input.

2. Related Art

Portable computer systems, such as "palmtop" computer systems, or personal digital assistants (PDA) have become commonplace and extraordinarily useful electronic devices. A palmtop computer system includes a hand-held device and a cradle device to which it ports and which connects and synchronizes it to other computers. Owing to their portability, capability, and versatility, hand-held computer devices are designed to be used in a wide variety of environments, for many applications.

Portable computers are usually robustly packaged devices, designed for simplicity of operation and durability. Few penetrations expose their interiors, wherein their operational components reside. However, function/field selection buttons, on/off, interconnection, and other switching components expose the interior to some degree to allow accessibility for switching and other operations. Mechanical switching components, such as switches, buttons, and, especially, thumbwheels and associated potentiometers, variable capacitors, and the like, while ostensibly durable, have definite physical vulnerabilities and finite operational lifespans. Further, although designed for operational simplicity, using a portable computer system by manipulating these switching components requires some degree of tactile skill.

Portable computer systems may be used in harsh environments, unlike other computers designed with less of a degree of mobility, such as desktop computer systems. For example, desktop computer systems most often find application in offices, classrooms, and similar milieus, with environments subject to some relatively satisfactory degree of control. Portable computer systems, on the other hand, while indeed they may also be used in such environments, are designed for use almost anywhere, contributing to their versatility and usefulness, e.g., a vehicle, outside, etc.

Portable computer systems are frequently and reliably deployed in-transit, in private and public modes of transportation of almost every kind. Portable computer systems find operational deployment in the field in, for example, industrial, urban, marine, construction, and even military application. Under these circumstances, their operational environment may vary widely and change rapidly, often subject to little or no control. These environments may also be quite rugged, extreme, wet, dirty, contaminated, and dusty.

When their operational environment is rugged, extreme, wet, dirty, dusty, or contaminated, operation of the portable computer system may contribute to or cause internal contamination or physical damage. Environmental contaminants such as moisture, dirt, dust, chemicals, and the like, may penetrate even the small openings for exposure of switching components to user manipulation, especially thumbwheels and their associated potentiometers. Once inside the portable computer, or a connector or button, they may cause fouling, damage, or destruction of is internal microelectronic and other components. And while switching components may be designed for durability, they all display some degree of physical vulnerability and aging degradation characteristics.

Although designed for operational simplicity, portable computer systems require some dexterity to operate properly. To operate the portable computer system to accomplish these tasks, controls and switching components must be manipulated. Manipulation enables, for example, choosing a screen, scrolling through various screens, selecting an on-screen icon, field, menu, listing, or data entry, or "writing to" or "typing on" an on-board touch-sensitive writing pad-like surface with a stylus, or other touch-enabling probe.

However, also owing to their versatility and portability, portable computer systems may be operated by a user who is purposefully multi-tasking, or otherwise engaged in other activities besides operating the portable computer. Portable computer systems are routinely utilized to, for example, access telephone numbers from an on-board telephone list, reminders from an on-board list of memoranda, gaming, portable internet browsing or email access, and a host of other computer-enabled and/or enhanced activities, all while the user is fully engaged in some other task.

When the circumstances under which portable computer systems are used become complex and distracting, operation of the portable computer system may become difficult. This may detract from the computing experience of the user. It may cause errors or loss of data, and/or require operational steps to be repeated. This is inconvenient and costly.

Conventionally, an approach to solving the problem of internal exposure of portable computers to environmental contaminants has been to attempt to minimize the interior exposure. This has been accomplished in one attempted solution by reducing the number and size of penetrations through their cases, and to seal the penetrations. Reducing the number of penetrations requires a concomitant reduction in the number of switching components. This requires switching components to have multiple, selectable functions. However, this has the undesirable effect of increasing operational complexity. Sealing the penetrations increases packaging complexity and increases unit costs, and interferes with switching component operations.

Conventionally, an approach to solving the problem of making portable computer device operation less complicated for engaged users, especially those simultaneously engaged in activities besides computing, has been to simplify the computer-user interface. This has been attempted, in one approach, by adding switching components. However, this has the undesirable effect of increasing package penetration with resulting increased internal exposure of the computer device to environmental contaminants.

Another conventional method of attempting to solve this problem has been to change the characteristics of the switching components. For instance, in one approach, a "jog wheel," "thumb wheel," or similar of rotary dial-type mechanism. However, this particular approach is especially vulnerable to environmental contamination problems.

Rotary dial-type mechanisms rotate about a shaft, which penetrates the package of the portable computer system to actuate the rotationally variable electrical components contained within. This shaft penetration is potentially a route for incursion of environmental contamination to the sensitive interior of the portable computer device. Exacerbating this problem is the size of the rotary dial, itself. Normally, such dials are larger than other switches penetrating the portable computer device package. Further, the dial has a lower surface facing the portable computer device package, yet not quite abutting it.

The space beneath the dial, between the dial and the portable computer device package is especially susceptible to the accumulation of moisture, detritus, dirt, dust, debris, oil, and chemicals. This is particularly problematic for three reasons. First, because the potential environmental contaminants remain there, proximate to a potential incursion route to the portable computer system interior even after the portable computer system is removed from the contaminating environment. Second, it increases the time of exposure to the potential environmental contaminants, thus increasing the probability of incursion. Third, the space between the dial and the portable computer device package is very hard to clean, and attempts to clean it may actually force contaminants into the shaft incursion route and into the interior of the portable computer.

The conventional art is problematic therefore for two related reasons. First, because attempts to promote ease of use of portable computer devices threaten increased risk of internal exposure thereof to environmental contamination. Second, because attempts to reduce risk of internal exposure of portable computer devices to environmental contamination complicate their use and increase their cost.

What is needed is a method and/or apparatus that promotes a positive computing experience for users of portable computer systems and/or increases overall durability and/or longevity thereof. What is also needed is a method and/or apparatus that promotes the operational simplicity of portable computer systems. Further, what is needed is a method and/or apparatus that enables efficient portable computer function, field, and data selection, gaming, input, interconnection, and other switching-related functions without exposing the portable computer interior to any degree to incursion of environmental contamination. Further still, what is needed is a method and/or apparatus that achieves the foregoing accomplishments while allowing the full range of both portability and environmental exposure, and range and ease of use characteristic of portable computer devices, yet without complete redesign.

SUMMARY OF THE INVENTION

An apparatus and method are described herein, which simultaneously promote a positive computing experience for users of portable computer systems and increases overall durability and longevity thereof. An apparatus and method are described herein, which also promote the operational simplicity of portable computer systems. Further, an apparatus and method are described herein, which enable efficient portable computer function, field, and data selection, gaming, input, interconnection, and other switching-related functions without exposing the portable computer interior to any degree to incursion of environmental contamination. Further still, an apparatus and method are described herein, which achieve the foregoing accomplishments while allowing the full range of both portability and environmental exposure, and range and ease of use characteristic of portable computer devices, yet without completely redesigning portable computer system packaging and operation.

In one embodiment, the present invention is directed to an apparatus and method, which promote a positive computing experience for users of portable computer systems. Simultaneously, the present embodiment promotes overall portable computer device durability and longevity. In the present embodiment, an optical apparatus and a method for using it enhance the experience of a user attempting to compute. Further, the optical apparatus is much more durable and long-lasting than mechanical switch and dial type devices it may replace.

In one embodiment, the present invention is directed to an apparatus and method, which also promote the operational simplicity of portable computer systems. In the present embodiment, an optical apparatus and method of using it simplify operations such as function, field, and data selection, gaming, input, interconnection, browsing, scrolling, and other switching-related functions. This promotes use of the device while engaged in activities beside computing, enhancing versatility.

In one embodiment, the present invention is directed to an apparatus and method, which enable efficient portable computer device function, field, and data selection, gaming, input, interconnection, and other switching-related functions without exposing the portable computer interior to any degree to incursion of environmental contamination. In the present embodiment, an optical apparatus obviates openings in portable computer which were conventionally required, in the prior art, for mechanically manipulated switches. Advantageously, this deters encroachment of environmental contaminants into the interior of the portable computer device.

In one embodiment, the present invention is directed to an apparatus and method, which achieve the foregoing advantages while allowing the full range of both portability and environmental exposure, and range and ease of use characteristic of portable computer devices, yet without completely redesigning portable computer system packaging and operation. The same basic portable computer device package is still applicable. In the present embodiment, an optical apparatus obviating mechanically manipulated switch openings deters incursion of contaminants into portable computer device interiors. With no package redesign, portable computer devices may continue to be deployed in all environments, now with greatly reduced risk of damage and/or contamination.

These and other objects and advantages of the present invention will become obvious to those of ordinary skill in the art after reading the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
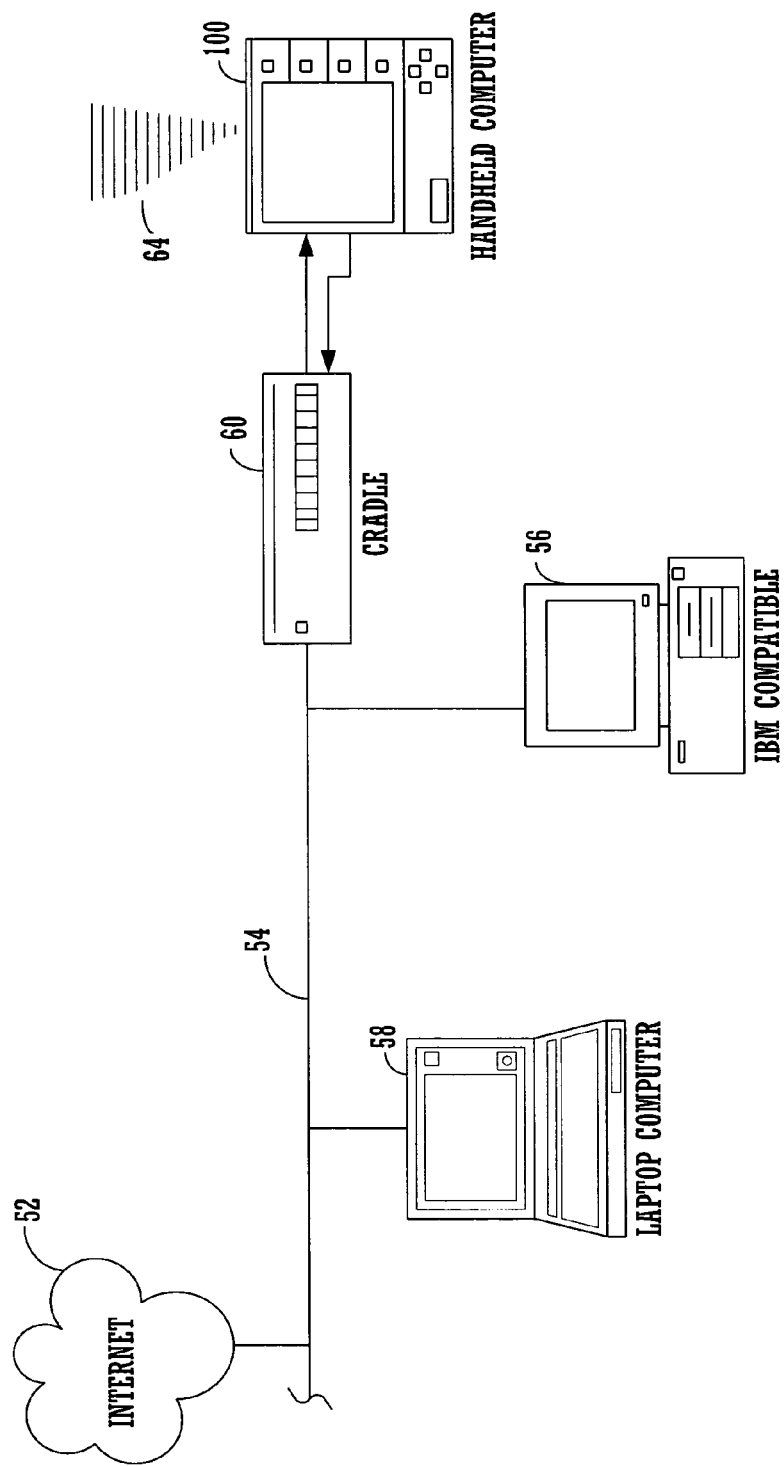
FIG. 1 is a system illustration of a portable computing system connected to other computer systems and the Internet via a cradle device.

The drawings referred to in this description should not be understood as being drawn to scale except if specifically noted.

DETAILED DESCRIPTION OF THE INVENTION

In the following detailed description of the present invention, an optical sensor based user interface for a handheld device, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

NOTATION AND NOMENCLATURE

Some portions of the detailed descriptions, which follow, are presented in terms of procedures, steps, logic blocks, processing, and other symbolic representations of operations on data bits that can be performed on computer memory. These descriptions and representations are the means used by those skilled in the electronic, computer, and data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating" or "coupling" or "changing" or "scanning" or "sending" or "sensing" or "processing" or "repeating" or "adjusting" or "modifying" or "displaying" or "highlighting" or "scrolling" or "formatting" or "selecting" or "moving" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention is discussed in one example in the context of a portable computer system, such as a portable computer device, palmtop computer, or personal digital assistant. However, it is appreciated that the present invention can be used with other types of devices that require user interfacing with a computer, e.g., cell phones, remote control devices, portable web browsers, pagers, etc.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details.

Although the optical sensor based user interface of the present invention may be implemented in a variety of different electronic systems such as a pager, a mobile phone, a calculator, a personal digital assistant (PDA), etc., one exemplary embodiment includes the optical sensor based user interface with a portable computing system. It should be understood that the descriptions corresponding to FIGS. 1-4 provide some general information about an exemplary portable computing system.

Exemplary Portable Computer System

FIG. 1 illustrates a system 50 that may be used in conjunction with an exemplary portable computing device 100. Specifically, system 50 comprises a host computer system 56 which can either be a desktop unit as shown, or, alternatively, can be a laptop system 58. Optionally, one or more host computer systems can be used within system 50. Host computer systems 56 and 58 are shown connected to a communication bus 54, which in one embodiment can be a serial communication bus, but could be of any of a number of well known communication standards and protocols, e.g., a parallel bus, Ethernet, Local Area Network (LAN), and the like. Optionally, bus 54 can provide communication with the Internet 52 using a number of well known protocols.

Bus 54 is also coupled to a cradle 60 for receiving and initiating communication with portable computing device 100. Cradle 60 provides an electrical and mechanical communication interface between bus 54 (and anything coupled to bus 54) and the portable computer system 100 for two way communications. Computer system 100 also contains a wireless infrared communication mechanism 64 for sending and receiving information from other devices.

Figure 2A:
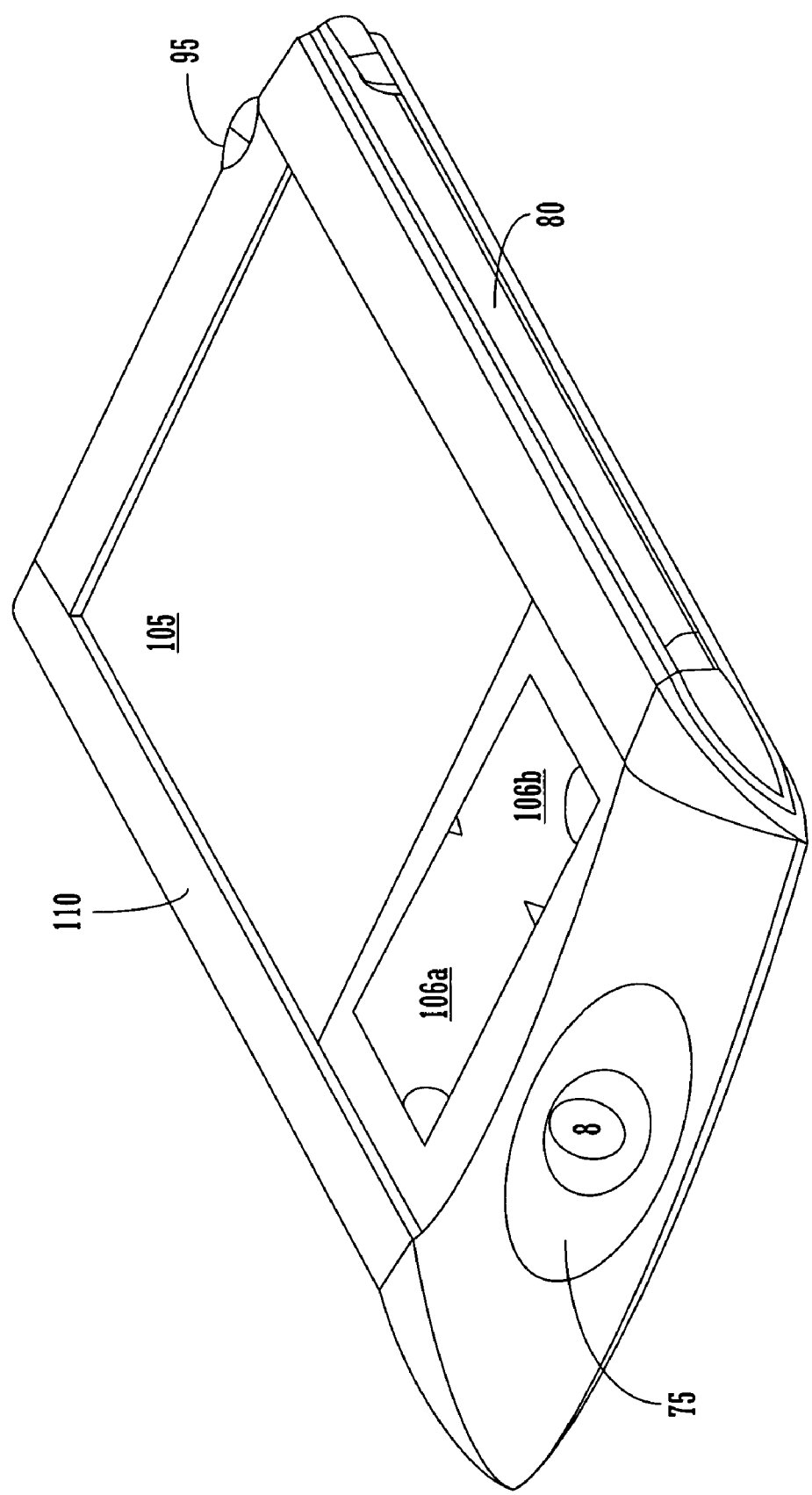
FIG. 2A is a perspective illustration of the top face of an exemplary portable computer system.
Figure 2B:
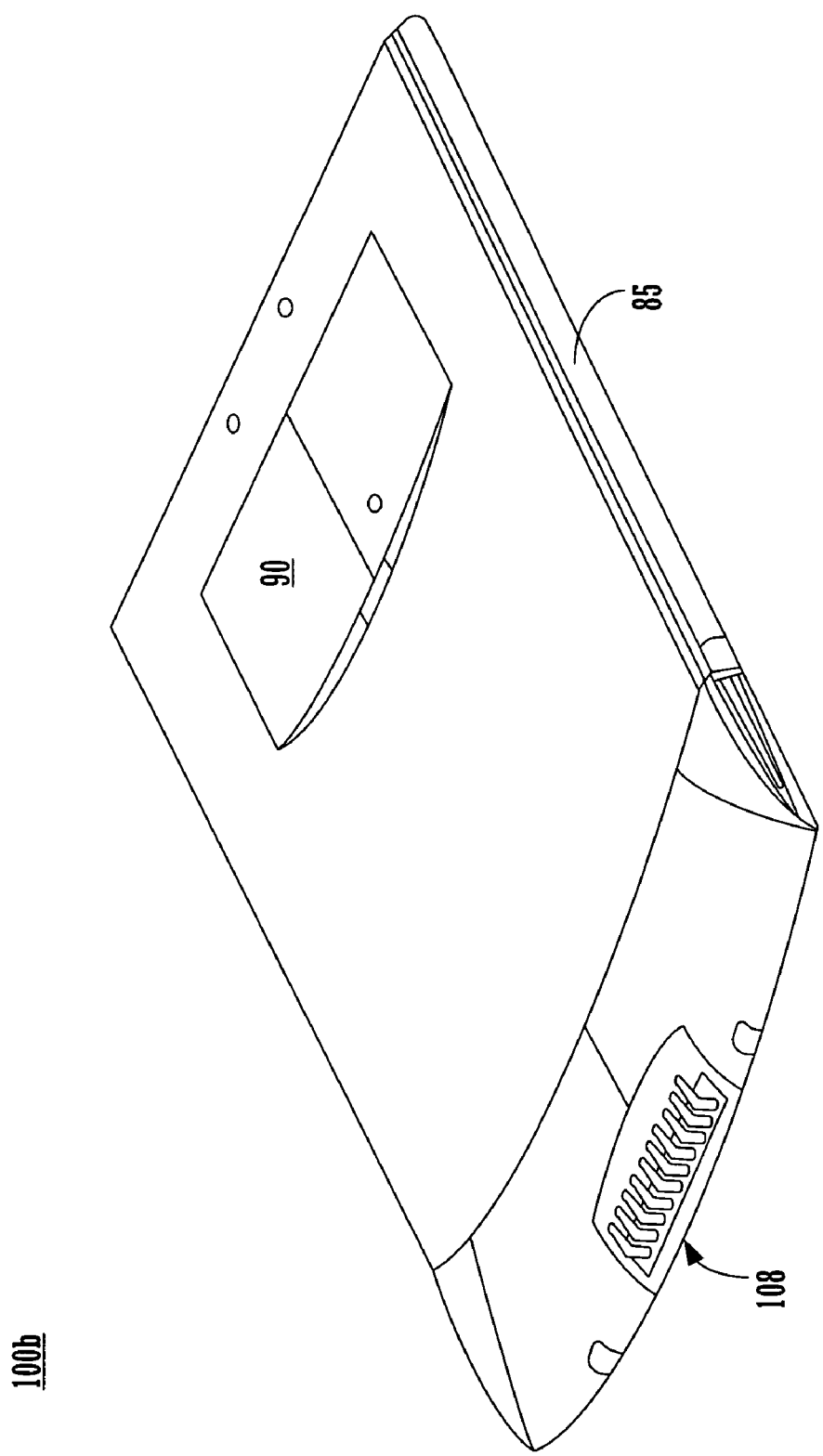
FIG. 2B is a perspective illustration of one embodiment of a bottom side of the portable computer system of FIG. 2A.

FIG. 2A is a perspective illustration of the top face 100a of an exemplary portable computer system 100. The top face 100a contains a display screen 105 surrounded by a top cover 110. A removable stylus 80 is also shown. The display screen 105 is a touch screen able to register contact between the screen and the tip of the stylus 80. Additionally, the stylus 80 can be fabricated of any material to make contact with the screen 105. The top face 100a also contains one or more dedicated and/or programmable buttons 75 for selecting information and causing the computer system 100 to implement functions. The on/off button 95 is also shown.

FIG. 2A also illustrates a handwriting recognition pad or "digitize" containing two regions 106a and 106b. For example, region 106a is for the drawing of alpha characters therein for automatic recognition while region 106b is for the drawing of numeric characters therein for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

FIG. 28 is a perspective illustration of one embodiment of a bottom side 100b of portable computer system 100. An optional extendible antenna 85 is shown and also a battery storage compartment door 90 is shown. A communication interface 108 is also shown. In one embodiment of the present invention, the communication interface 108 is a serial communication port, but could also alternatively be of any of a number of well known communication standards and protocols, e.g., parallel, small computer system interface (SCSI), Ethernet, FireWire (IEEE 1394), Universal Serial Bus (USB), etc.

Figure 3:
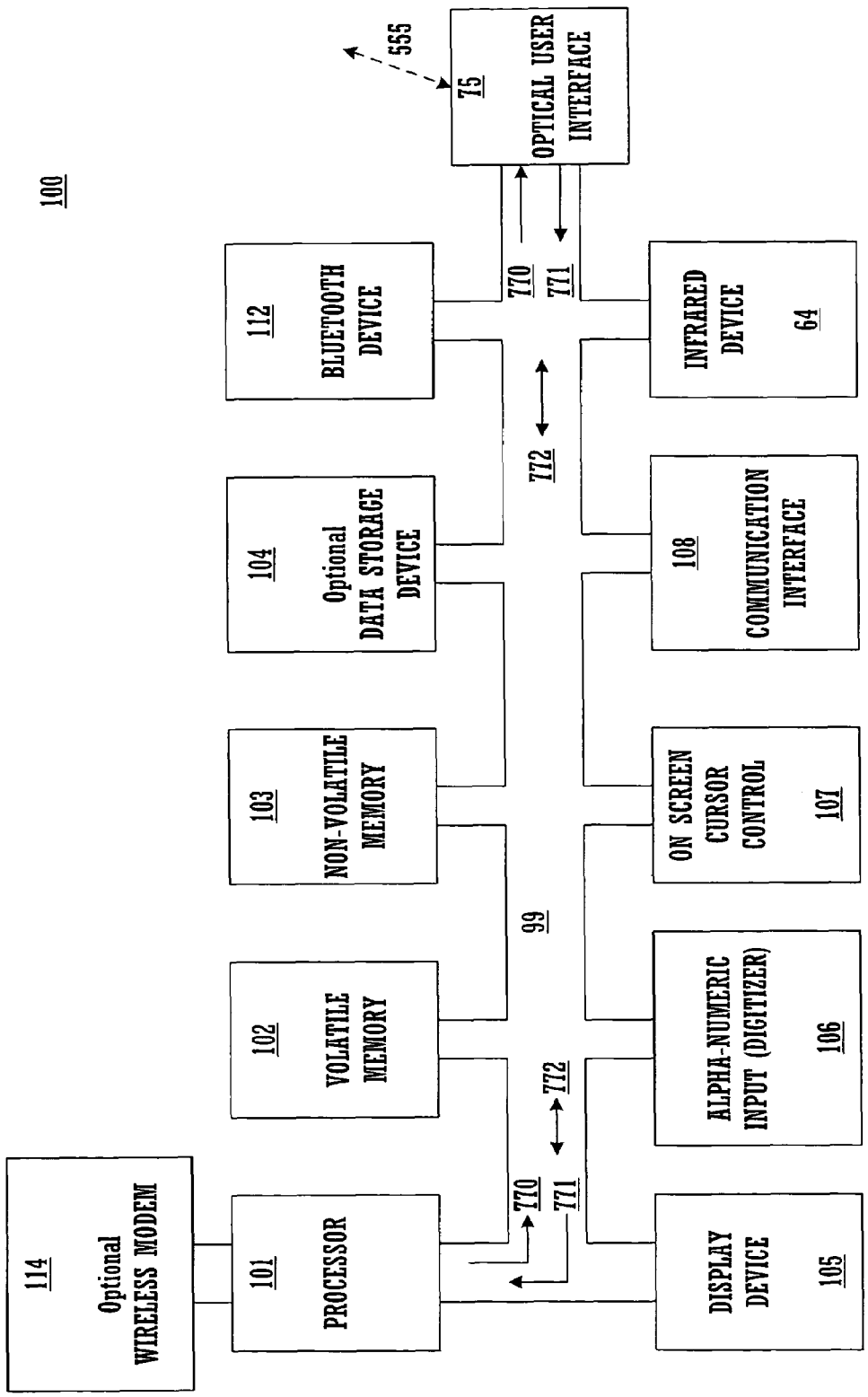
FIG. 3 is a block diagram of exemplary circuitry of a portable computing system in accordance with one embodiment of the present invention.

FIG. 3 is a block diagram of exemplary circuitry of portable computing system 100 in accordance with one embodiment of the present invention. The computer system 100 includes an address/data bus 99 for communicating information, a central processor 101 coupled with the bus 99 for processing information and instructions. It is appreciated that central processor unit 101 may be a microprocessor or any other type of processor. The computer system 100 also includes data storage features such as a volatile memory 102 (e.g., random access memory, static RAM, dynamic RAM, etc.) coupled with the bus 99 for storing information and instructions for the central processor 101 and a non-volatile memory 103 (e.g., read only memory, programmable ROM, flash memory, EPROM, EEPROM, etc.) coupled with the bus 99 for storing static information and instructions for the processor 101. Computer system 100 may also include an optional data storage device 104 (e.g., thin profile removable memory) coupled with the bus 99 for storing information and instructions. It should be understood that device 104 may be removable. Furthermore, device 104 may also be a secure digital (SD) card reader or equivalent removable memory reader.

Also included in computer system 100 of FIG. 3 is an alphanumeric input device 106 which in one implementation is a handwriting recognition pad ("digitizer") and may include integrated push buttons in one embodiment. Device 106 can communicate information (spatial data and pressure data) and command selections to the central processor 101. The digitizer 106 records both the (x, y) coordinate value of the current location of the stylus 80 and also simultaneously records the pressure that the stylus 80 exerts on the face of the digitizer pad 106. The coordinate values (spatial information) and pressure data are then output on separate channels for sampling by the processor 101. In one implementation, there are roughly 256 different discrete levels of pressure that can be detected by the digitizer 106. Since the digitizer's channels are sampled serially by the processor 101, the stroke spatial data are sampled "pseudo" simultaneously with the associated pressure data. The sampled data is then stored in a memory by the processor 101 for later analysis.

System 100 of FIG. 3 also includes an optional cursor control or directing device 107 coupled to the bus 99 for communicating user input information and command selections to the central processor 101. In one implementation, device 107 is a touch screen device (also a digitizer) incorporated with screen 105. Device 107 is capable of registering a position on the screen 105 where the stylus 80 makes contact and the pressure of the contact. The digitizer of 106 or 107 may be implemented using well known devices, for instance, using the ADS-7846 device by Burr-Brown that provides separate channels for spatial stroke information and pressure information.

Computer system 100 also contains a flat panel display device 105 coupled to the bus 99 for displaying information to the computer user. The display device 105 utilized with the computer system 100 may be a liquid crystal device (LCD), cathode ray tube (CRT), field emission device (FED, also called flat panel CRT), plasma or other display technology suitable for creating graphic images and alphanumeric characters recognizable to the user. In one embodiment, the display 105 is a flat panel multi-mode display capable of both monochrome and color display modes.

Also included in computer system 100 of FIG. 3 is a signal communication device 108 coupled to bus 99 that may be a serial port (or USB port) for enabling system 100 to communicate with the cradle 60. As mentioned above, in one embodiment, the communication interface 108 is a serial communication port, but could also alternatively be of any of a number of well known communication standards and protocols, e.g., parallel, SCSI, Ethernet, FireWire (IEEE 1394), USB, etc. In addition to device 108, wireless communication links can be established between the device 100 and a host computer system (or another portable computer system) using a Bluetooth wireless device 112, an infrared (IR) device 64, or a Global System for Messaging (GSM) radio device 114. System 100 may also include a wireless modem device 114 and/or a wireless radio, e.g., a GSM wireless radio with supporting chip set. The wireless modem device 114 is coupled to communicate with the central processor 101 but may not be directly coupled to port 108.

In one implementation, the Mobitex wireless communication system may be used to provide two way communication between computer system 100 and other networked computers and/or the Internet (e.g., via a proxy server). In other embodiments, transmission control protocol (TCP) can be used or Short Message Service (SMS) can be used. System 100 of FIG. 3 may also contain batteries for providing electrical power.

In one embodiment, Optical User Interface 75 is coupled to Processor 101 by bus 99. In one embodiment, processor 101 sends an optical signal generation demand signal 770 to optical user interface 75. In the present embodiment, optical user interface 75 generates an optical signal 555 accordingly. Signal 770, in one embodiment, controls the optical scan rate of optical user interface 75. After a user interaction, optical signal 555 is redetected by optical user interface 75, which generates a corresponding interface signal 771, which is sent to processor 101, in one embodiment, with a scan rate power usage signal 772. In one implementation, optical user interface 75 interacts with display device 105 for control of the exhibition of visually formatted information. In one embodiment, optical user interface 75 interacts with on-screen cursor control 107 and display device 105 for control and positioning of an on-screen cursor. In one embodiment, optical user interface 75 interacts with digitizer 106. In one embodiment, digitizer 106 is a mechanically flexible and optically transparent pad, enabling both optical and mechanical user interaction via optical user interface 75, in an optical-electromechanical user interaction enabling implementation. In one embodiment, the optical user interaction is controlled by a program implemented by computer readable and executable instructions distributed to varying degrees in various implementations between processor 101, RAM 102, ROM 103, and storage device 104.

Figure 4:
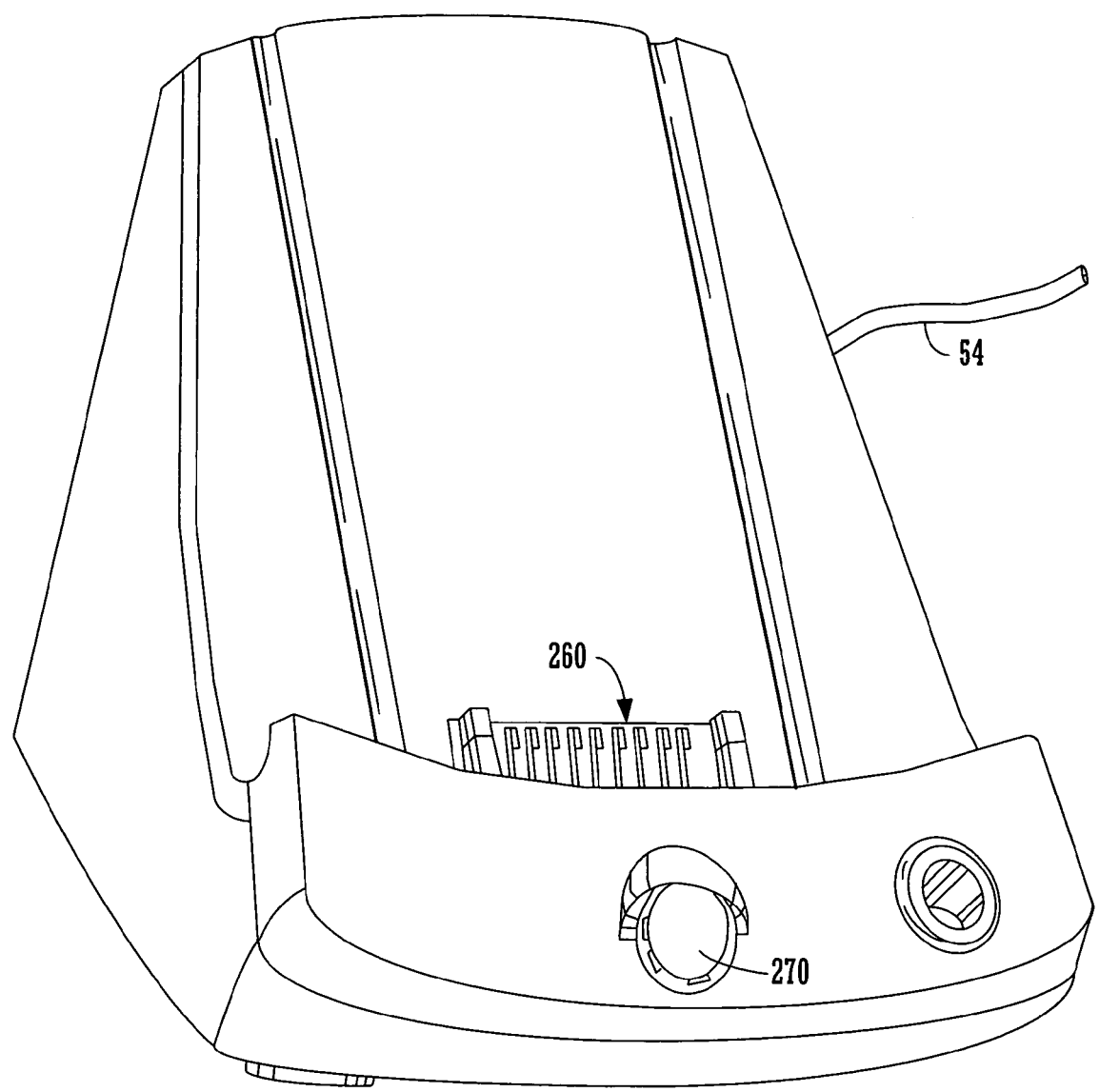
FIG. 4 is a perspective view of the cradle device for connecting the portable computing system to other systems via a communication interface.

FIG. 4 is a perspective illustration of one embodiment of the cradle 60 for receiving the portable computer system 100. The cradle 60 contains a mechanical and electrical interface 260 for interfacing with communication interface 108 (FIG. 2B) of computer system 100 when system 100 is slid into the cradle 60 in an upright position. Once inserted, button 270 can be pressed to initiate two way communication between portable computer system 100 and other computer systems coupled to communication bus 54.

Exemplary User Interfaces

Exemplary Optical User Interfaces

Figure 5A:
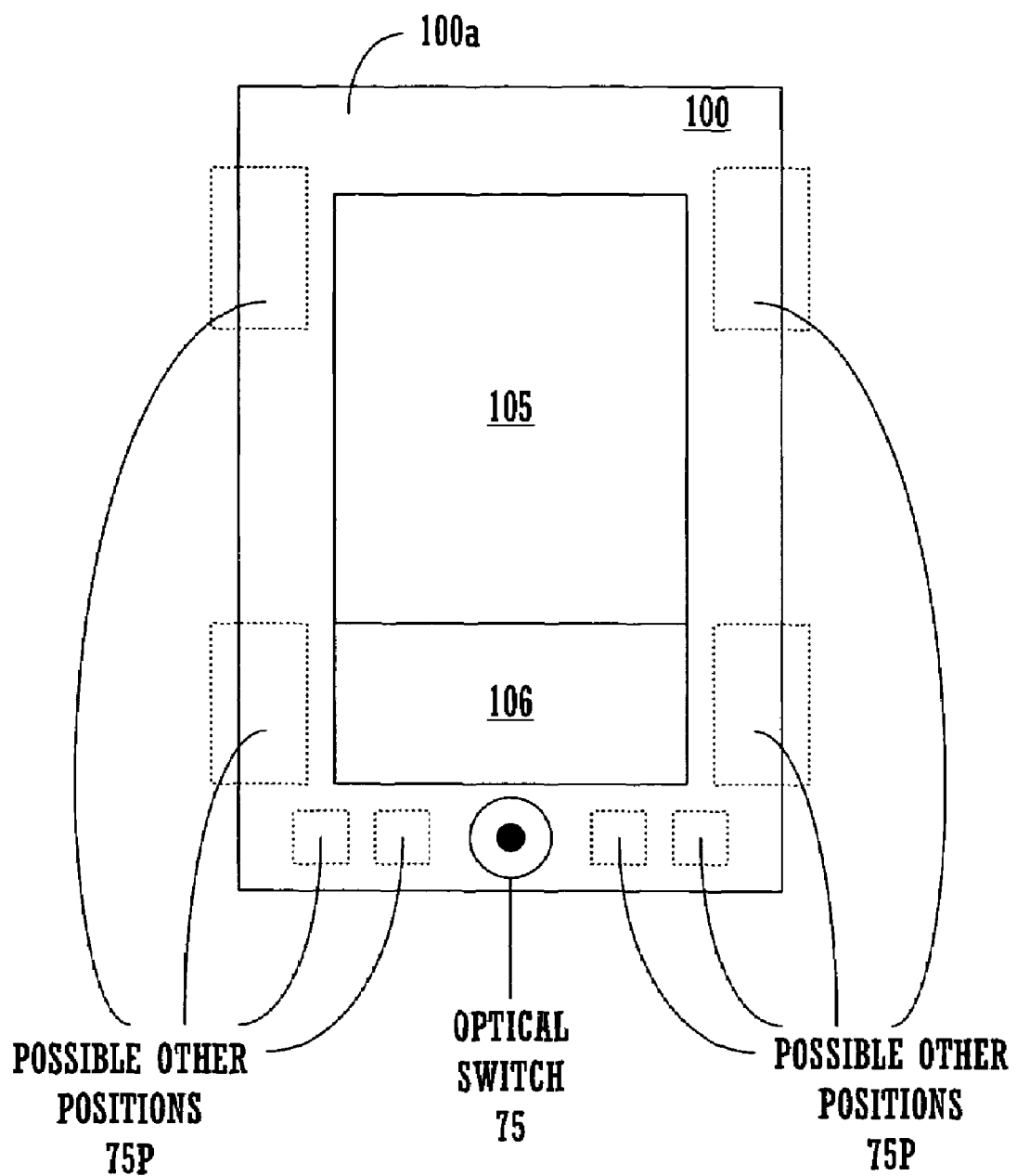
FIG. 5A is a perspective view of the top face of an exemplary portable computer device incorporating an optical user interface, in accordance with one embodiment of the present invention.

FIG. 5A is a perspective illustration of the top face 100a of one embodiment of a palmtop computer system 100, that can be used with the present invention. Optical user interface 75 is depicted as mounted, in one embodiment, in the center of the lower portion of top face 100a, below screen 105 and digitizer 106.

In one embodiment, optical user interface 75 interacts with digitizer 106, and may be mounted beneath it. In the present embodiment, digitizer 106 is a mechanically flexible and optically transparent pad, enabling both optical and mechanical user interaction via optical user interface 75, in an optical-electromechanical user interaction enabling implementation.

It is appreciated that the position depicted for optical user interface 75 herein is not intended to be limiting. For example, optical user interface 75 may be mounted in any user accessible position on system 100. Such positions are illustrated, for example only, and not limited to, possible other positions 75p.

Figure 5B:
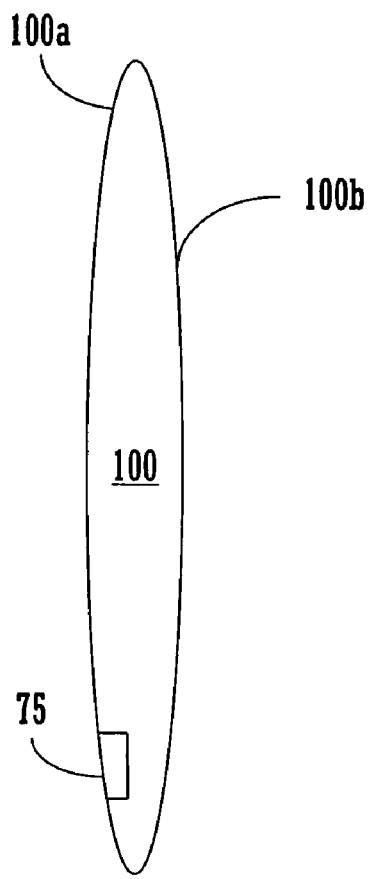
FIG. 5B is a perspective view of the side edge of an exemplary portable computer device incorporating an optical user interface, in accordance with one embodiment of the present invention.

In FIG. 5B, a perspective illustration of the side edge of exemplary system 100 is depicted. Optical user interface 75 is depicted, for example only, and not limited, in a position low on the upper face 100a. Lower face 100b is depicted opposite to upper face 100a, for perspective.

Figure 5C:
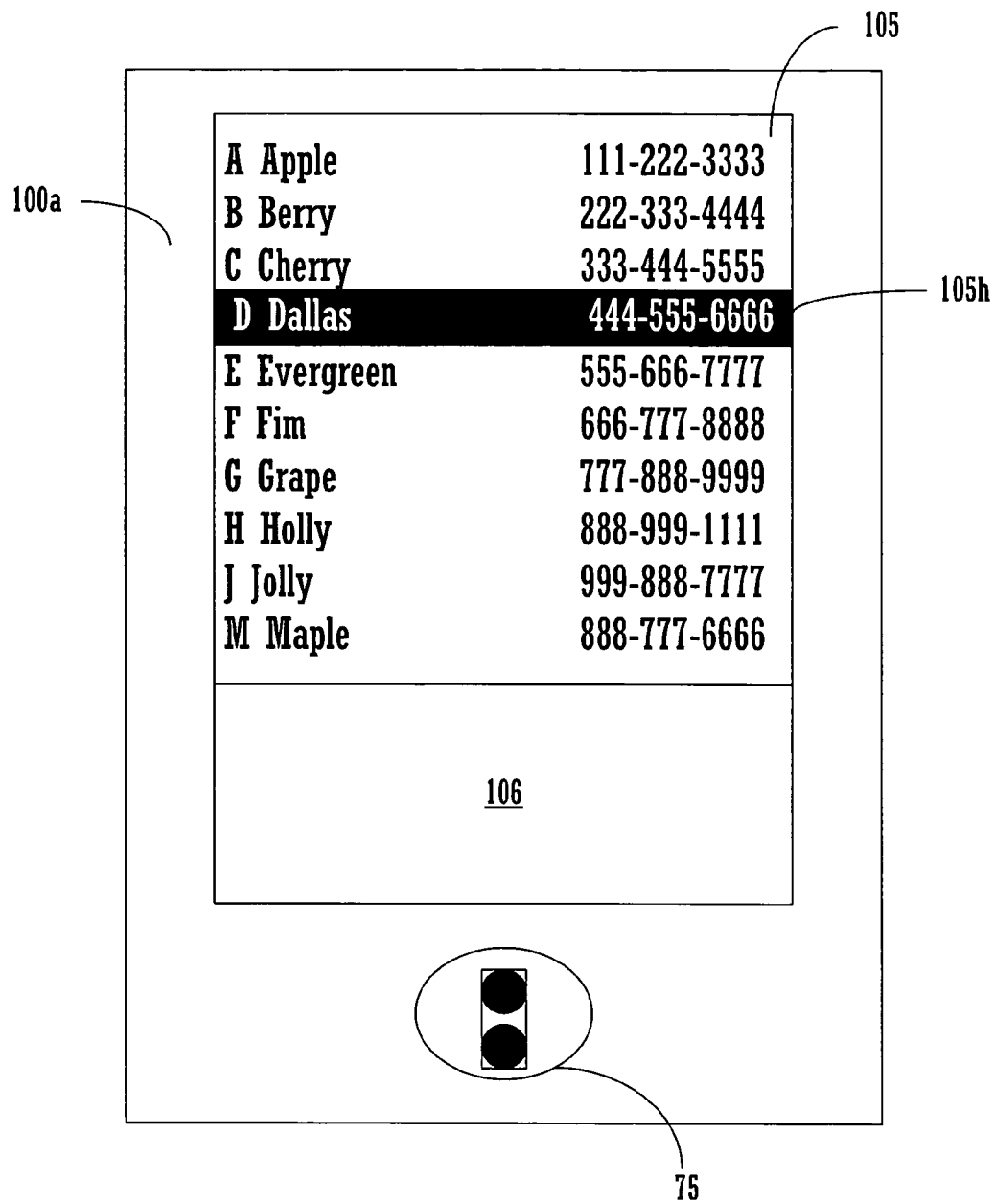
FIG. 5C is a perspective view of the side edge of an exemplary portable computer device, depicting an array of visually formatted information, including text and highlighted text, on a display screen, and incorporating an optical user interface, in accordance with one embodiment of the present invention.

In FIG. 5C, a perspective of the top face 100a of one embodiment of a palmtop computer system 100, that can be used with the present invention. Optical user interface 75 is depicted as mounted, in one embodiment, in the center of the lower portion of top face 100a, below screen 105 and digitizer 106. In one embodiment, optical user interface 75 interacts with digitizer 106, and may be mounted beneath it.

Screen 105 displays an exemplary array of visually formatted information 105d. In the present example, the array of visually formatted information 105d includes text. It is appreciated that array of visually formatted information 105d is not limited to text, but may include graphics, combinations of text and graphics, and any other visually formatted information. In the present example, the text constituting array of visually formatted information 105d is a portion of an imaginary telephone list including names and corresponding telephone numbers, a common and useful portable computer system feature. It is appreciated that the text constituting array of visually formatted information 105d may include any textual information not to be construed as delimited by the present example. In the present example, the text constituting array of visually formatted information 105d includes a highlighted portion 105h. Highlighted portions of text or other forms of visually formatted information may be used to focus a user's attention, to target data for selection, and other purposes. In one embodiment, highlighting can be moved through scrolling. In one embodiment, highlighting and scrolling may be performed by a user interacting with system 100 through manipulation of optical user interface 75.

Figure 6A:
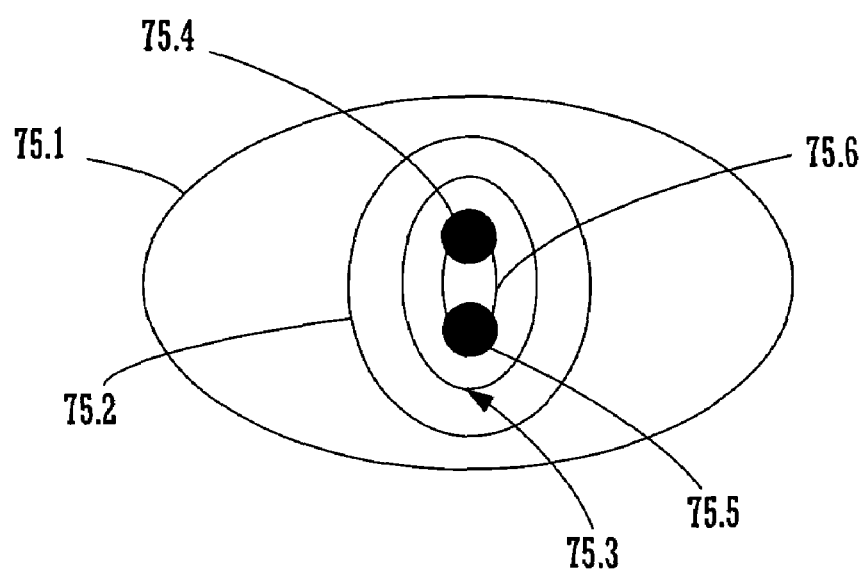
FIG. 6A is a concentric top view of an exemplary optical user interface, in accordance with one embodiment of the present invention.

Referring to FIG. 6A, a detailed concentric top view of an exemplary optical user interface 75, in accordance with one embodiment of the present invention, is described. A transparent covering 75.1 covers optical user interface 75.

In one embodiment, transparent covering 75.1 is flexible and mounted beneath digitizer 106, which, in the present embodiment, is flexible and transparent, likewise. In one embodiment, transparent covering 75.1 forms a part of flexible and transparent digitizer 106. In one embodiment, flexible and transparent digitizer 106 constitutes transparent covering 75.1. In one embodiment, flexible and transparent digitizer 106 is embedded within transparent cover 75.1 (e.g., as depicted in FIG. 7B). In any of the present embodiments, digitizer 106 is a mechanically flexible and optically transparent pad, enabling both optical and mechanical user interaction via optical user interface 75, in an optical-electromechanical user interaction enabling implementation.

Importantly, transparent covering 75.1 covers optical user interface 75, yet allows optical interaction with a user. Further, transparent covering 75.1 seals optical user interface 75, and system 100 about optical user interface 75. Advantageously, this prevents the incursion of environmental contaminants to seals optical user interface 75, and system 100. Optical user interface enclosure 75.2 forms a package about optical user interface 75 optical and electrical components to be described next.

Optical user interface package foundation 75.3 mounts an optical source 75.4 and an optical sensor 75.5. Further, optical user interface package foundation 75.3 forms an optical portal 75.6, such as an optically transmissive channel with precisely reflective and focusing contours capable of coupling optical source 75.4 and an optical sensor 75.5.

In one embodiment, optical sensor 75.5 is a solid state photosensitive electro-optical device which generates an electrical output corresponding to an optical input. In one embodiment, optical sensor 75.5 is a quantum photodetector. In one embodiment, optical sensor 75.5 is a radiometer. In one embodiment, optical sensor 75.5 is a pyroelectric detector. In one embodiment, optical sensor 75.5 works photoconductively. In one embodiment, optical sensor 75.5 works photovoltaically.

In one embodiment, optical source 75.4 is a light emitting diode (LED). In one embodiment, optical source 75.4 is a laser diode (LD). In one embodiment, optical source 75.4 is a quantum dot. For simplicity, optical source 75.4 will herein be referred to as an exemplary LED 75.4. LED 75.4 and optical detector 75.5 operate at frequencies which enable their interoperation and coupling. In one embodiment, optical user interface operation is at visible wavelengths. In one embodiment, optical user interface 75 operation is in the infrared. In one implementation, operation of the optical user interface 75 is in the near infrared.

Optical portal 75.6 couples LED 75.4 and optical sensor 75.5 in such a way that a user interaction, such as touching transparent covering 75.1, optically modifies the optical coupling between LED 75.4 and optical sensor 75.5. Optically coupled scanning between LED 75.4 and optical sensor 75.5 occurs at a rate controlled by processor 101 (FIG. 3). Optically coupled scanning between LED 75.4 and optical sensor 75.5 enables detection of commencement, progression, development and modification, and termination of interactions with users.

Figure 6B:
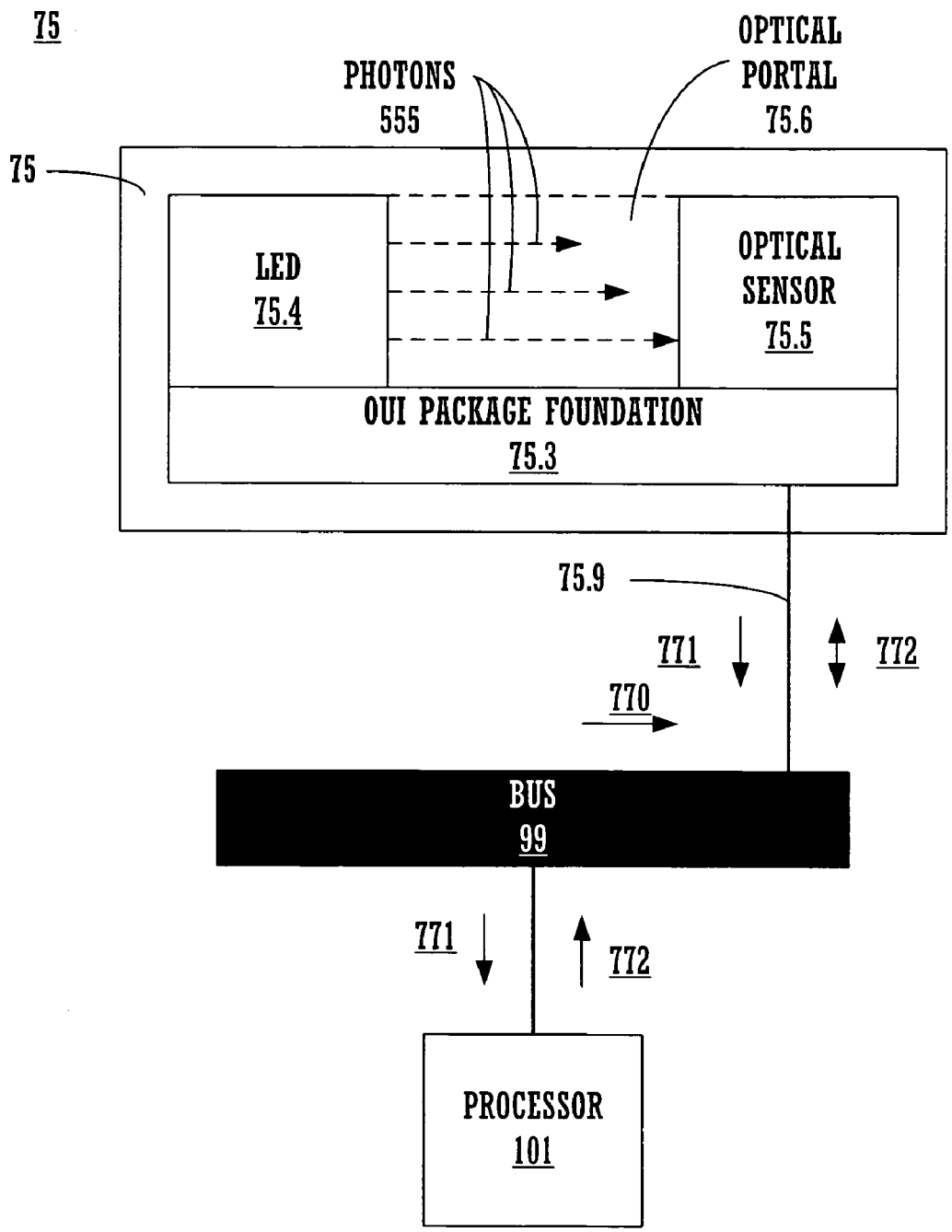
FIG. 6B is a block diagram of electrical elements of an exemplary optical user interface, in accordance with one embodiment of the present invention.

In one embodiment, the user touches transparent covering 75.1. The touch may be implemented by the user's thumb or fingertips, for example. In one embodiment, the changes in optical coupling between LED 75.4 and optical detector 75.5 corresponding to the touch and detected by scanning result in the generation of an interaction signal (interaction signal 771; FIG. 6B). In one embodiment, the optical coupling between LED 75.4 and optical detector 75.5 corresponding to the touch and detected by scanning can be further, stochastically, and/or continually changed by the user varying the touch to transparent cover 75.1, for example, by movement of the thumb or fingertips touching transparent cover 75.1 This correspondingly results in the optical scanning tracking the user transaction and further generating an interaction signal 771 accordingly transmitting the scan-tracking information to processor 101. Processor 101 may process the information to generate programmatic response. Scan rates may be variable, in one embodiment. In the present embodiment, variable scan rates may implement a scan rate power usage protocol, transmitted by scan rate power usage signals 772. It is appreciated that the optical user interface 75 may also, in one embodiment, enable further and/or other user interaction by, for example, an electromechanical modality.

In FIG. 6B, the optical and electrical interrelationship 75E between elements constituting optical user interface 75, system bus 99, and processor 101 are depicted. Optical user interface package foundation 75.3 mounts and electrically interconnects LED 75.4 and optical sensor 75.5.

Optical user interface package foundation 75.3 mounts LED 75.4 and optical sensor 75.5 in such a configuration as to delineate optical portal 75.6, optically coupling LED 75.4 and optical sensor 75.5. LED 75.4 and optical sensor 75.5 are optically coupled through optical portal 75.6 such that optical signal 555, emitted by LED 75.4, may be detected by optical sensor 75.5.

Optical user interface sub-bus 75.9 electrically interconnects LED 75.4 and optical sensor 75.5, through optical user interface packaging foundation 75.3, to bus 99, which is electrically interconnected with processor 101. Signals interflow between these elements as follows.

Optical signal generation demand signal 770, generated by processor 101, flows over busses 99 and 75.9, through optical user interface packaging foundation 75.3 interconnection, to LED 75.4, stimulating LED 75.4 to emit optical signal 555 accordingly. Processor 101 thus controls optical signal 555 and corresponding optical scanning via optical portal 75.6.

Interface signal 771, generated by optical sensor 75.5 responsive to detection and conversion of optical signal 555, flows through optical user interface packaging foundation 75.3 interconnection, over busses 75.9 and 99, sequentially, to processor 101. Processor 101 processes interface signal 771 programmatically.

Further, in one embodiment, processor 101 controls the optical scan rate employed by optical user interface 75 (FIG. 6A) by and according to scan rate power usage signal 772. Scan rate power usage signal 772 transmits information corresponding to the scan rate power usage from optical user interface 75 to processor 101, and transmits responsive scan rate control from processor 101 to optical user interface 75.

In one embodiment, optical user interface 75 functions as an optical sensor operable to sense movement of an object over a surface thereof, and a processor is responsive to said optical sensor for altering said selected item according to said movement. In one embodiment, optical user interface 75 functions as an optical sensor operable to sense tactile contact of said object with said surface. In one embodiment, optical user interface 75 functions as an optical sensor operable to sense the speed of said movement of said object. In one embodiment, optical user interface 75 functions as an optical sensor operable to sense the direction of said movement of said object. In the present embodiment, control circuitry coupled to optical user interface 75 is operable to vary a rate at which optical sensor 75.5 is scanned in response to detected user activity.

Processor 101, in the present embodiment, is responsive to optical sensor 75.5 sensing user interactive movement at a first speed to perform a first display update of the array of visually formatted information (e.g., text 105.*d*; FIG. 5C) Further, processor 101 is responsive to optical sensor 75.5 sensing user interactive movement at a second speed to perform a second update of said information. In the present embodiment, this enables coarse scroll operation in the first processor response, and a fine scroll operation in the second. The user's finger may establish the optical contact with optical user interface 75 to implement these interactions.

Exemplary Optical-Electromechanical User Interfaces

Figure 6C:
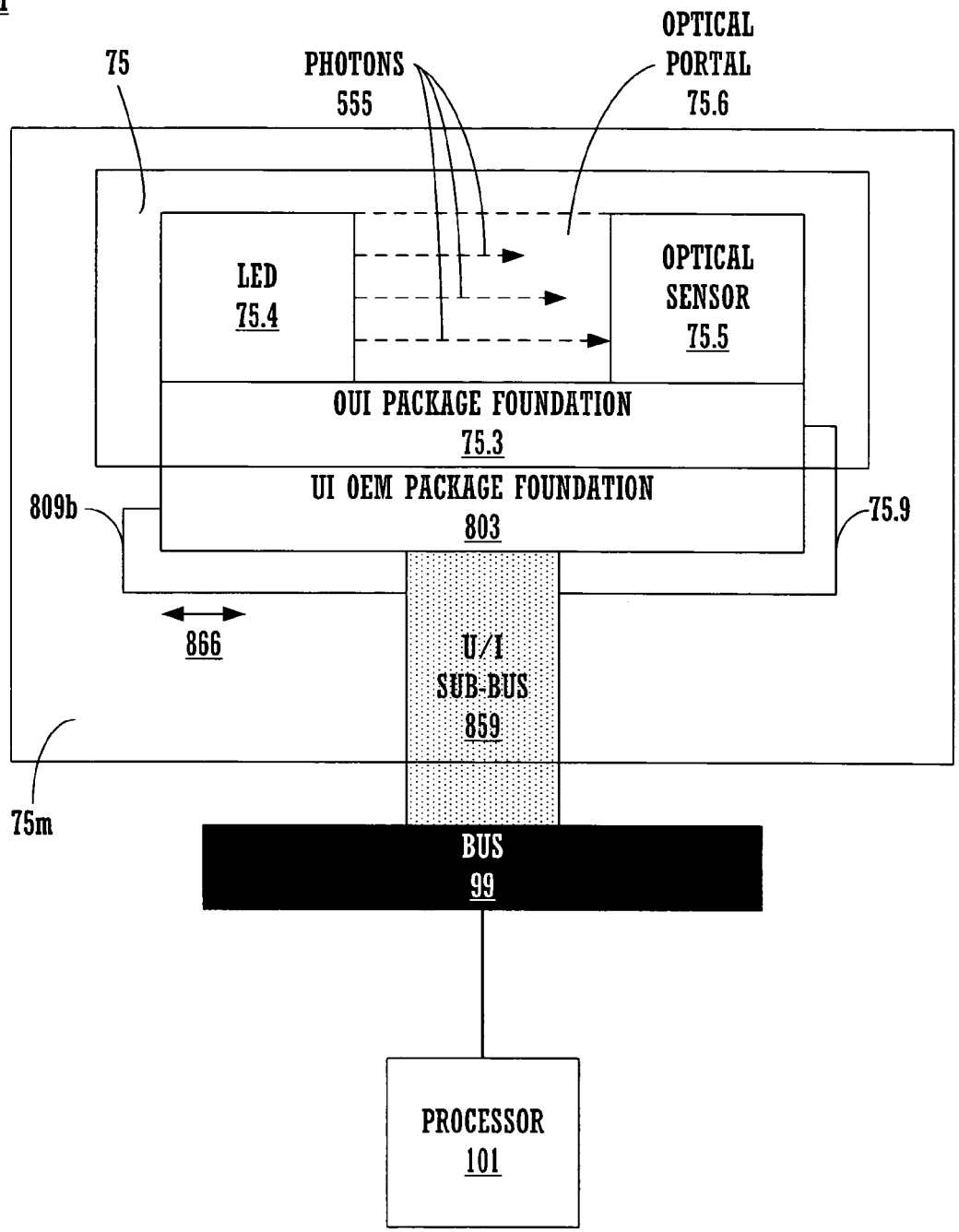
FIG. 6C is a block diagram of electrical elements of an exemplary combination optical-electromechanical user interface, in accordance with one embodiment of the present invention.

With reference to FIG. 6C, the optical and electrical interrelationship 75EM between elements of an exemplary combination optical-electromechanical user interface 75*m* is depicted, in accordance with one embodiment of the present invention. Optical user interface package foundation 75.3 mounts LED 75.4 and optical sensor 75.5 in such a configuration as to delineate optical portal 75.6, optically coupling LED 75.4 and optical sensor 75.5. LED 75.4 and optical sensor 75.5 are optically coupled through optical portal 75.6 such that optical signal 555, emitted by LED 75.4, may be detected by optical sensor 75.5. Optical user interface sub-bus 75.9 electrically interconnects LED 75.4 and optical sensor 75.5, through optical user interface packaging foundation 75.3, to user interface mid-bus 859, which is electrically interconnected through bus 99 with processor 101.

Figure 7A:
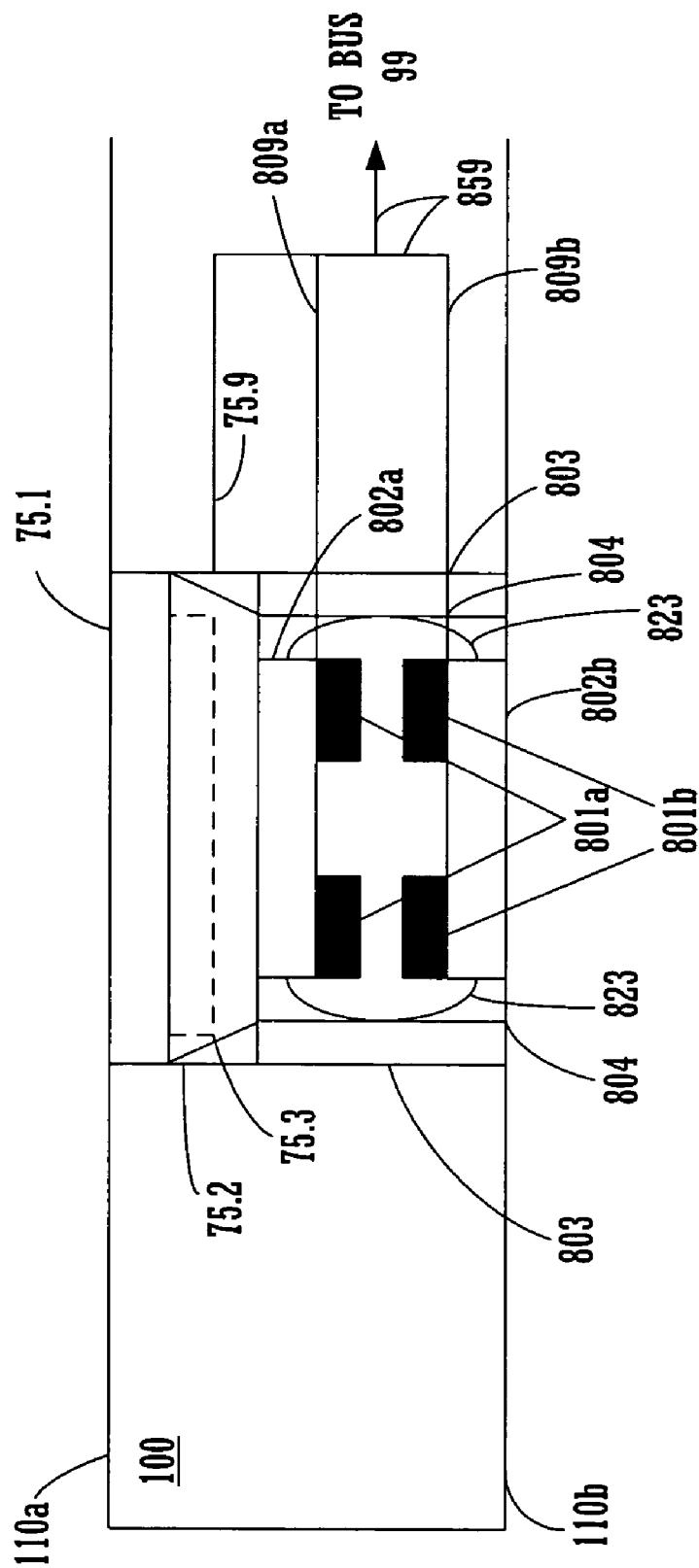
FIG. 7A is a schematic diagram of an exemplary combination optical-electromechanical user interface, in accordance with one embodiment of the present invention.
Figure 7B:
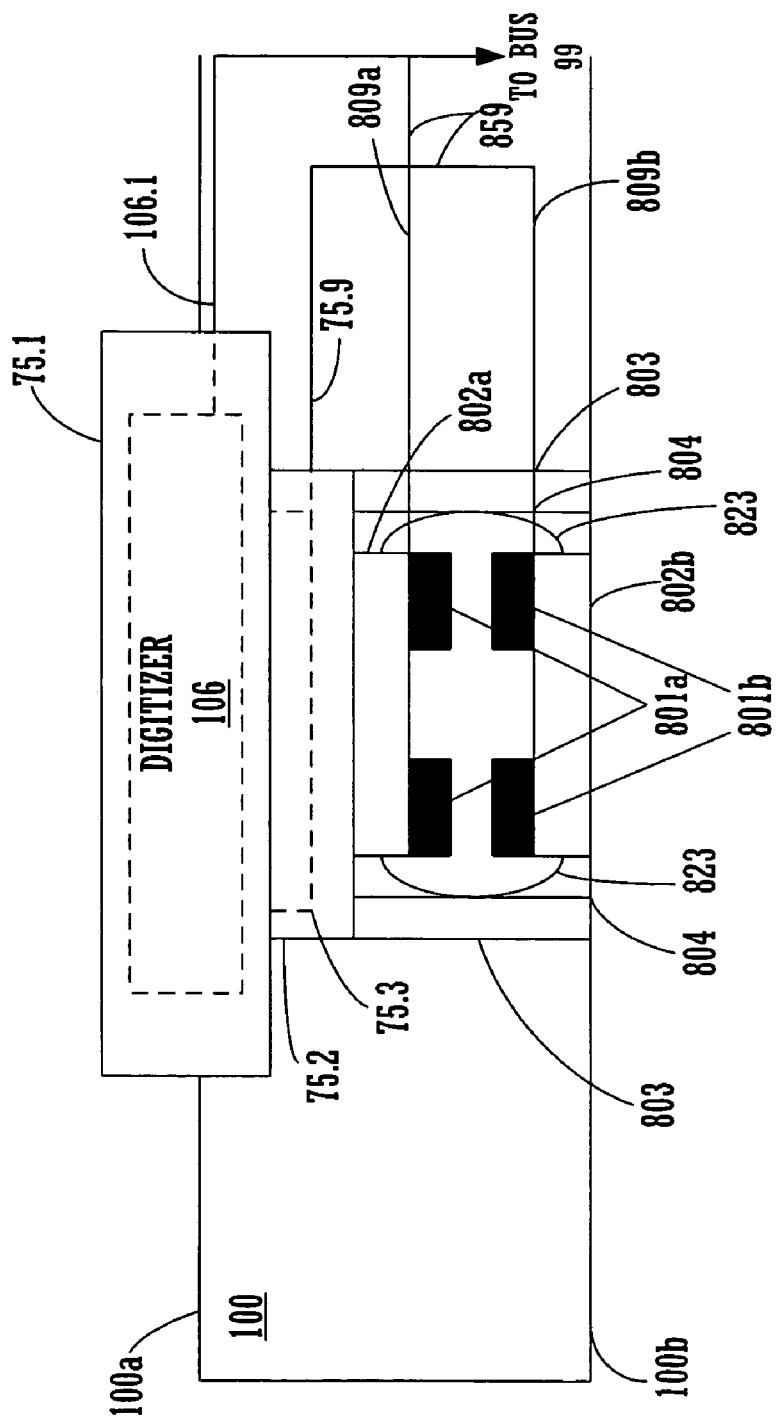
FIG. 7B is a schematic diagram of en exemplary combination optical-electromechanical user interface, incorporating an exemplary flexible digitizer element, in accordance with one embodiment of the present invention.

User interface opto-electromechanical package foundation 803 mounts optical user interface module 75, and contains an electromechanical user interface enabling device such as a switch or dial (e.g., switch 804, FIGS. 7A and 7B). User interface electromechanical package foundation 803 electrically interconnects the electromechanical user interface (e.g., switch 804, FIGS. 7A and 7B) contained within it via electromechanical interface sub-bus 809*b* to user interface mid-bus 859, which is electrically interconnected through bus 99 with processor 101, and transmits electromechanical interface signal 866 thereon.

With reference to FIG. 7A, an exemplary combination optical-electromechanical user interface enables several modalities of user interaction, in accordance with one embodiment of the present invention. An electronic device, in the present illustration, exemplary portable computer system 100, has a top face 100a and a bottom face 100b. Embedded within and sealing top face 100a is transparent cover 75.1.

Transparent cover 75.1 covers optical user interface enclosure 75.2 which contains optical user interface package foundation 75.3 mounting LED 75.4 and optical sensor 75.5 (FIG. 6). Further, optical user interface package foundation 75.3 forms an optical portal 75.6 (FIG. 6C), such as an optically transmissive channel with precisely reflective and focusing contours capable of coupling optical source 75.4 (FIG. 6C) and an optical sensor 75.5 (FIG. 6C). Optical user interface enclosure 75.2 forms a package about optical user interface 75 optical and electrical components (FIG. 6C). Optical user interface 75 (FIGS. 6B and 6C) generates an optical interface signal 771 (FIG. 6B).

Mounting optical user interface (e.g., optical user interface 75; FIG. 6C) components 75.1, 75.2, and 75.3, opto-electromechanical package foundation 803 also houses electromechanical user interface enabling components including, in the present embodiment, a switch assembly 804.

Switch assembly 804 contains a lower, foundational and non-moving base 802b, fixedly mounted on the upper (e.g., inner) surface of base 110b (e.g., internal to exemplary computer 100). Base 802b mounts a set of fixed electrical contacts 801b. An upper plug 802a mounts movable electrical contacts 801a, is spring supported and guided by spring assembly 823. Upper plug 802a and contacts 801a move up and down in switch assembly 804 in such a way as to respond to the interaction of a user, for example, pressing down on transparent cover 75.1, and make and break contact between movable contacts Bola and fixed contacts 801b accordingly.

Upon contact by a sufficiently forcible user interaction, movable contacts 801a will make and wipe sufficiently on and over fixed contacts 801b to ensure a correspondingly sufficient electrical contact. The making and breaking of movable contacts 801a and fixed contacts 801b in response to a mechanical user interaction generate an electromechanical user interface signal 866 (FIG. 6C).

Optical user interface signal 771 flows on optical user interface sub-bus 75.9 (FIG. 6B). Electromechanical user interface signal 866 (FIG. 6C) flows on electromechanical sub-bus 809b. Sub-busses 75.9 and 809b are electrically interconnected with user interface mid-bus 859. User interface mid-bus 859 is electrically interconnected with bus 99 (FIGS. 3, 6C), enabling optical and electromechanical interface signals 771 and 866, respectively, to be sent to processor 101 (FIGS. 3 and 6C), and control signals to flow from processor 101 back to the user interfaces 75 and 75m (FIG. 6C).

Referring now to FIG. 7B, one embodiment of the present invention is depicted, wherein digitizer 106 is also flexible and transparent. In all other respects, the elements depicted in FIG. 7B are identical in form and function with those depicted in FIG. 7A. In the present embodiment, digitizer 106 is integrated with transparent cover 75.1. In the present embodiment, the transparency of digitizer 106, and its proximity to optical user interface package foundation 75.3, enables an interaction with a user for exemplary system 100 via the optical user interface (e.g., optical user interface 75; FIG. 6C). Further, the flexibility of digitizer 106, and its proximity to and mechanical integration with opto-electromechanical package foundation 803, enables an interaction with a user for exemplary system 100 via the electromechanical user interface (e.g., electromechanical user interface 75m; FIG. 6C).

In the present embodiment, flexible and transparent digitizer 106 is embedded within transparent cover 75.1 (e.g., as depicted in FIG. 7B). In one embodiment, transparent covering 75.1 is flexible and mounted beneath digitizer 106, which, in the present embodiment, is flexible and transparent, likewise. In one embodiment, transparent covering 75.1 forms a part of flexible and transparent digitizer 106. In one embodiment, flexible and transparent digitizer 106 constitutes transparent covering 75.1. In any of these embodiments, digitizer 106 is a mechanically flexible and optically transparent pad, enabling both optical and mechanical user interaction via optical user interface 75 (FIG. 6C) and electromechanical user interface 75m (FIG. 6C), in an optical-electromechanical user interaction enabling implementation. Digitizer sub-bus 106.1 is electrically interconnected with bus 99, interconnecting digitizer 106 with processor 101 (FIG. 3).

Exemplary Processes

FIGS. 8, 9A, 9B, and 10 are flowcharts of the steps performed in processes 800, 900A, 900B, and 1000, respectively, each individually in accordance with single, separate, individual embodiments of the present invention, as discussed separately below. Flowcharted processes 800, 900A, 900B, and 1000 each include a single, separate, individual process of the present invention which, in each embodiment, are carried out by processors and electrical components under the control of computer readable and computer executable instructions. The computer readable and computer executable instructions reside, for example, in data storage features such as within processor 101, computer usable volatile memory 102, computer usable non-volatile memory 103, and/or data storage device 104, all of FIG. 3. However, the computer readable and computer executable instructions may reside in any type of computer readable medium. Although specific steps are disclosed in each of flowcharts 800, 900A, 900B, and 1000, such steps are exemplary. That is, the present invention is well suited to performing various other steps or variations of the steps recited in FIGS. 8, 9A, 9B, and 10. Within these present embodiments, it should be appreciated that the steps of flowcharts 800, 900A, 900B, and 1000 may be performed by software or hardware or any combination of software and hardware.

Exemplary Process for User Interaction

Figure 8:
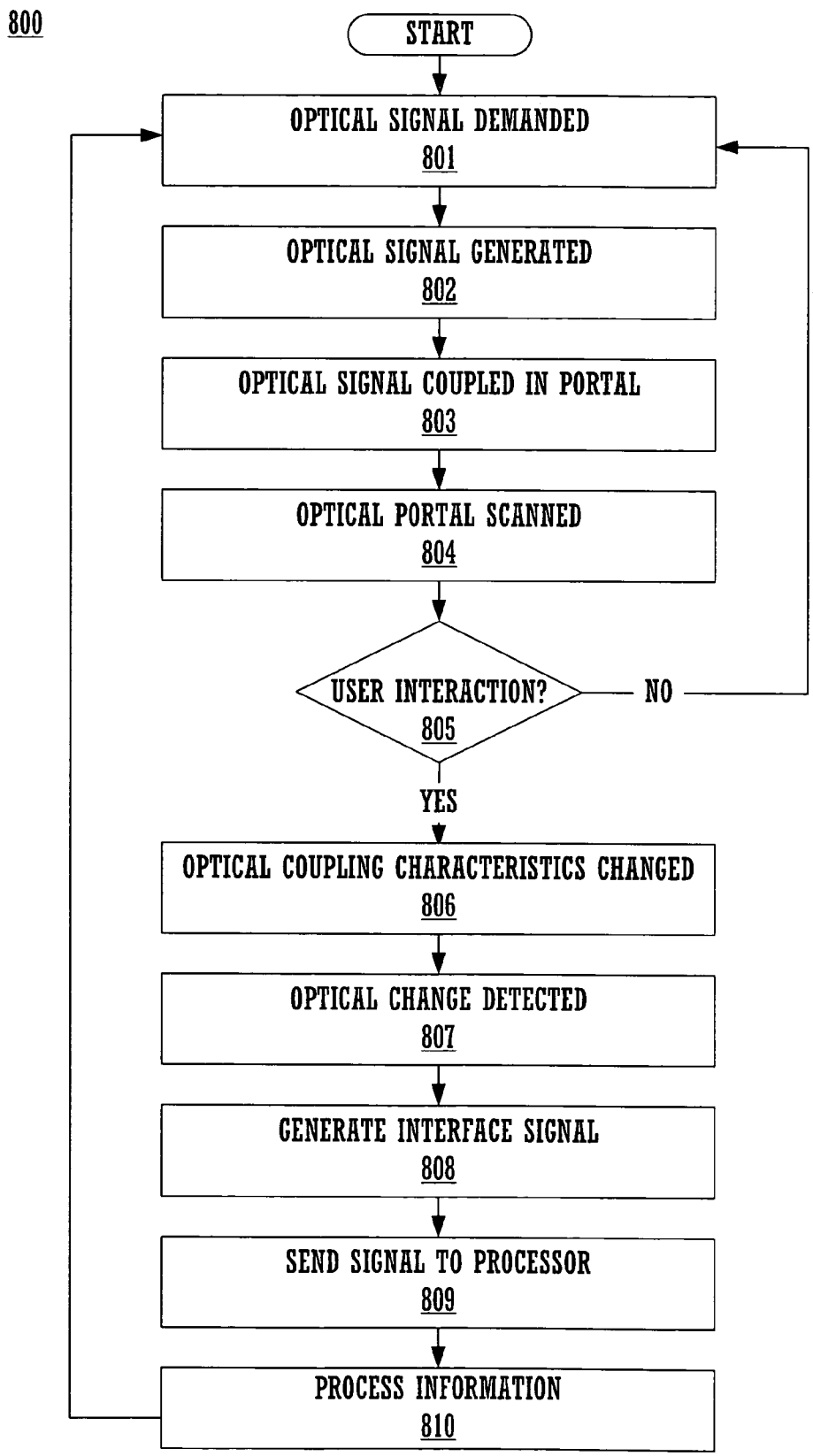
FIG. 8 is a flow chart of steps in an exemplary process for implementing an optical user interface for an electronic device, in accordance with one embodiment of the present invention.

Referring to FIG. 8, the steps in a process 800 enable the interaction of a user with a system (e.g., exemplary system 100; FIGS. 1, 3, 5A, 5B, 7A, and 7B) using an optical user interface (e.g., 75; FIGS. 2A, 3, 5A, 5B, 6A, 6B, 6C), in accordance with one embodiment of the present invention. Beginning with step 801, an optical signal (e.g., optical signal 555; FIGS. 6B and 6C) is demanded by a processor (e.g., processor 101; FIGS. 3, 6B, and 6C). The demand may be by a demand signal (e.g., 770; FIG. 6B).

In step 802, an optical signal (e.g., optical signal 555; FIGS. 6B and 6C) is generated responsive to the demand (step 801). The optical signal is generated by an optical source (e.g., optical source 75.4; FIGS. 6A, 6B, and 6C), which in one embodiment, is an LED.

In step 803, the optical signal is coupled from the optical source into an optical portal (e.g., optical portal 75.6; FIGS. 6A, 6B, and 6C).

The optical portal is scanned; step 804. Scanning, in one embodiment, may be performed by an optical sensor (e.g., optical detector 75.5; FIGS. 6A, 6B, and 6C).

Scanning the optical portal (step 804) enables the detection of a user interaction; step 805. If no user interaction is detected, process 800 loops back to demanding an optical signal (step 801), and the process repeats itself.

If, however, a user interaction is detected in step 805, the optical coupling characteristics of the optical portal are changed by the interaction of the user. This results in a corresponding change in the optical coupling characteristics of the optical portal coupling the source and detector; step 807.

Any change in optical coupling results in the generation of an interface signal in step 808.

Interface signals are sent to a processor (e.g., processor 101; FIGS. 3, 6B, and 6C); step 809. The interface signals may be sent via an interconnecting bus (e.g., bus 99; FIGS. 3, 6B, and 6C).

In step 810, the processor processes the interface signal as information, and process 800 loops back to the step of demanding an optical signal (step 801).

Exemplary Scan Rate Adjustment Process

Figure 9A:
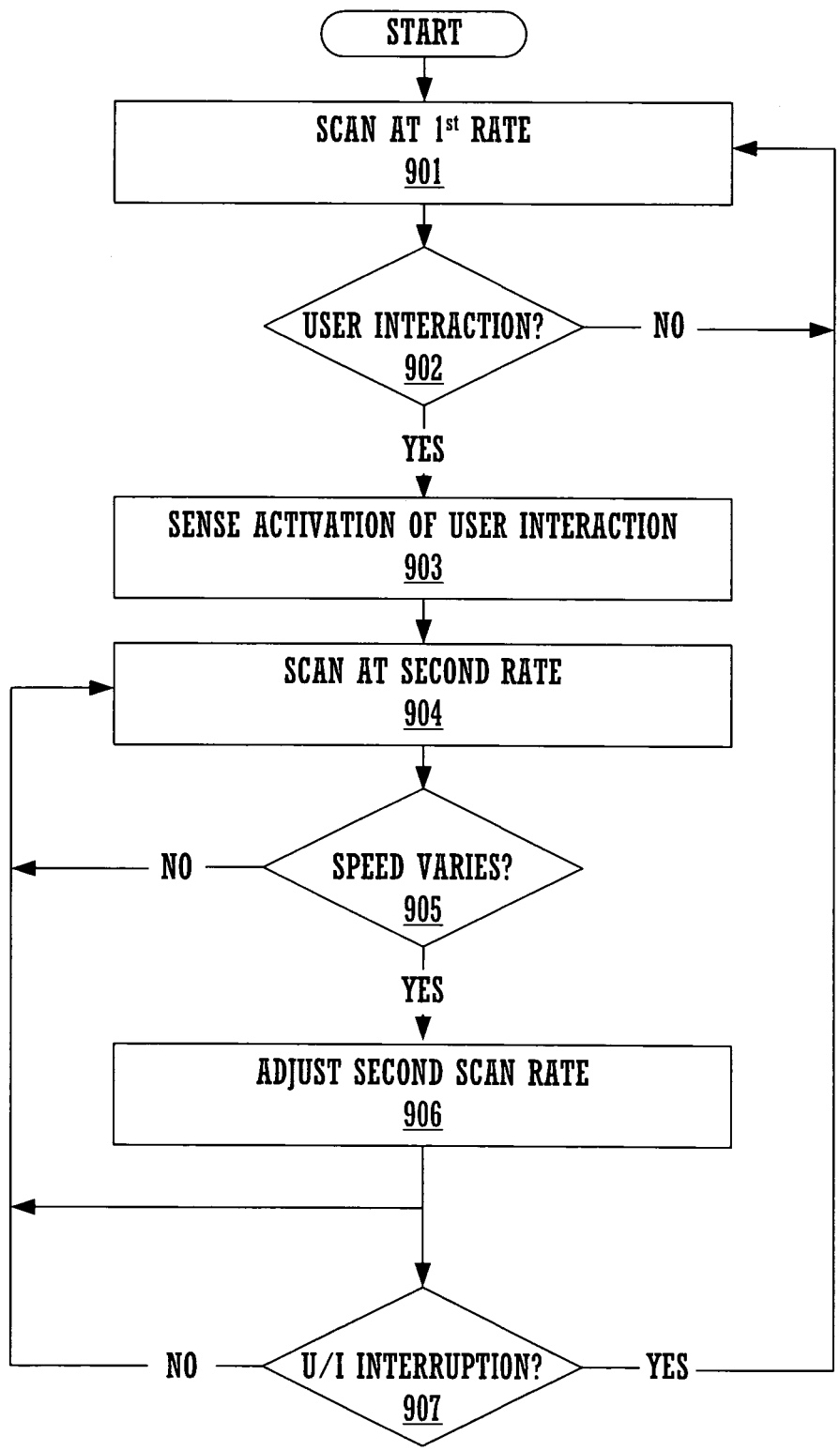
FIG. 9A is a flow chart of steps in an exemplary process for implementing a variable optical scan rate, in accordance with one embodiment of the present invention.
Figure 9B:
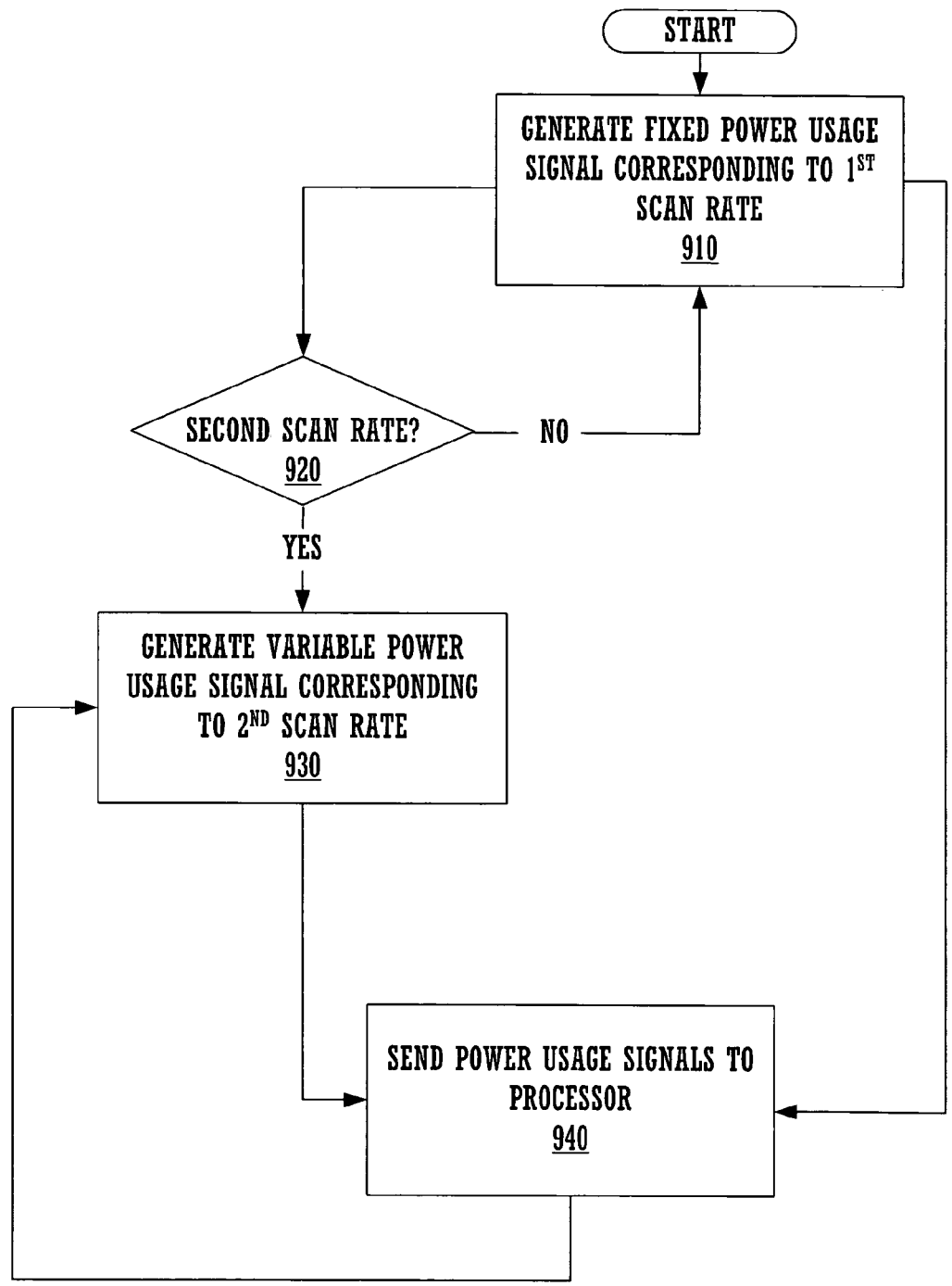
FIG. 9B is a flow chart of steps in an exemplary process for implementing a scan rate power usage protocol, in accordance with one embodiment of the present invention.

Referring to FIG. 9A, the steps in a process 900A are depicted wherein the scanning rate of an optical user interface is automatically adjusted, in accordance with one embodiment of the present invention. Beginning with step 901, the optical user interface (OUI) (e.g., OUI 75; FIGS. 3, 6A, 6B, and 6C) under the control of a processor (e.g., processor 101; FIGS. 3, 6B, and 6C), scans at a first, relatively slow rate.

If no interaction with a user is detected in step 902, process 900A continues the scanning at the first rate.

If however, an interaction with a user is detected in step 902, the activation of a user interaction is sensed; step 903.

Upon detecting activation of a user interaction (step 903), the scan rate is increased accordingly to an initial, relatively higher rate; step 904.

In step 905, the speed with which the user interaction is occurring and/or varying (for example, the relative speed and any speed variation with which the user's thumb passes, rubs, or flicks over the transparent cover of the optical portal, e.g., cover 75.1 and portal 75.6, respectively; FIGS. 6A, 6B, and 6C) is detected. If no variation in the speed with which the user interaction is occurring is detected, process 900A loops back to step 904, and continues to scan at the initial second rate.

If, however, a variation in the speed with which the user interaction is occurring is detected in step 905, the scan rate is adjusted accordingly; step 906. Further, the speed with which the user interaction is occurring and/or varying is continually monitored, process 900A looping back to step 905.

This continues as long as no interruption in the user interaction is detected in step 907. If an interruption in the user interaction is detected in step 907, process 900A loops back to step 901, with scanning resumed at the relatively slow first scan rate. In one embodiment, process 900A enables implementation of a scan rate power usage protocol.

Exemplary Scan Rate Power Usage Information Process

In one embodiment, a process 900B enables a processor (e.g., processor 101; FIGS. 3, 6B, and 6C) to receive information regarding power usage by optical scanning processes (e.g., process 900A; FIG. 9A).

Process 900B begins with step 910, wherein a fixed power usage signal is generated corresponding to a first scan rate (e.g., a relatively low initial scan rate, such as that scan rate generated in step 901; FIG. 9A).

Power usage signals generated in step 910 is sent to a processor; step 940.

In step 920, the scan rate is monitored. If scanning continues at the first scan rate (e.g., no user interaction is detected, as for example in step 902; FIG. 9A), the corresponding power usage signal continues to be generated, process 900B looping back to step 910.

If scanning at a second rate is detected in step 920, a variable power usage signal corresponding to the second scan rate and its changes is generated; step 930.

Power usage signals generated in step 920 is sent to a processor; step 940.

Power usage signals and corresponding control signals (e.g., signals 772; FIG. 6B) enable implementation of a scan rate power usage protocol.

Exemplary Process for Display Control

Figure 10:
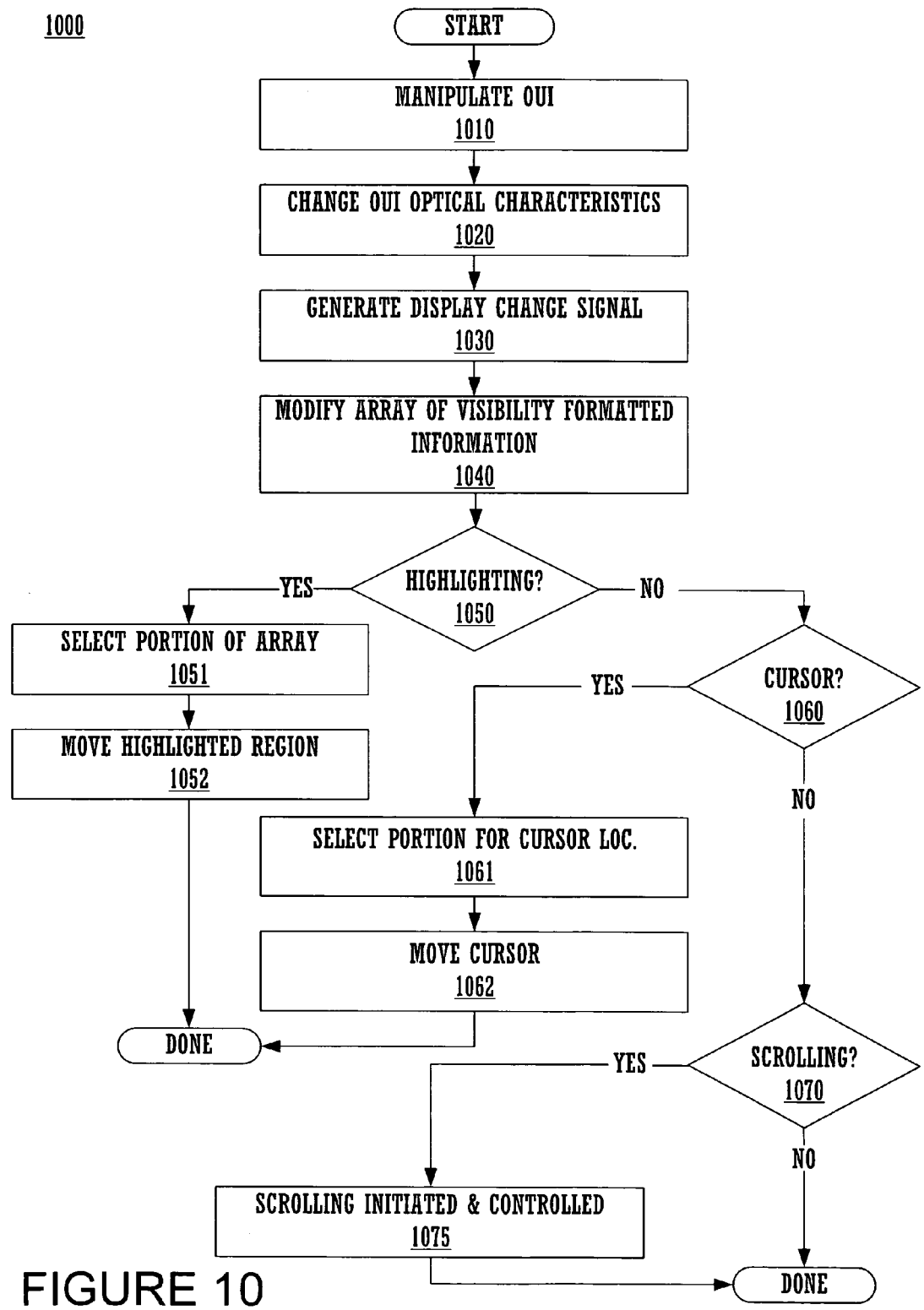
FIG. 10 is a flow chart of steps in an exemplary process for changing visually formatted information, in accordance with one embodiment of the present invention.

With reference to FIG. 10, a process 1000 enables the control of visually formatted information displayed on a screen (e.g., display screen 105; FIGS. 2A, 3, and 5A). Beginning with step 1010, a user manipulates an optical user interface (e.g., OUI 75; FIGS. 3, 5A, 5B, 6A, 6B, and 6C) according to the user's intent to vary visibly formatted information on the display screen.

The optical characteristics of the optical user interface are changed accordingly; step 1020.

Resultantly, a display change signal is generated; step 1030. Generating a display change signal may be a combination and interaction between integrated activities conducted by different system elements.

Upon changing optical characteristics in the optical user interface (step 1020), a corresponding interface signal (e.g., signal 771; FIG. 6B) is generated and sent to the processor (e.g., processor 101; FIGS. 3, 6B, and 6C). The processor programmatically responds to the interface signal by generating a responsive display control signal, which is transmitted to the display device to change the array of visibly formatted information thereon accordingly; step 1040. The programmatic response may be controlled by the processor under the direction of software or data stored, to varying degrees, in the processor itself, in memory, and/or in a data storage device (e.g., RAM 102, ROM 103, and/or storage 104, respectively; FIG. 3). If a cursor and/or scrolling, for example (discussed below in steps 1060 through 1075), is included in the array of visually formatted information displayed on the screen, an cursor controller (e.g., cursor control 107; FIG. 3) may also be involved.

In step 1050, it is determined if the user intends to change the highlighting of any portion of the array of visually formatted information, by which portions of the array may be designated or selected for change of selection of displayed information, or a scrolling function. If so, the portion to be highlighted is selected by optical user interfacing; step 1051.

The highlighting (e.g., the highlighted region of the array of visually formatted information on the display), or the highlighting itself, is moved; step 1052. At this point, process 1000 may be complete.

If no highlighting was determined for selection (step 1050), it is determined if the user intends to change the positioning of a cursor appearing within the array of visually formatted information, by which the attention and action of the user may be directed and/or focused; step 1060. If so, the position for placement of the cursor is selected by optical user interfacing in step 1061.

The cursor is thus moved to the designated location within the array of visually formatted information; step 1062. At this point, process 1000 may be complete.

If no cursor positioning was selected (step 1060), it is determined in step 1070 if the visually formatted information array is to be scrolled. If not, process 1000 may be complete.

If scrolling is designated (step 1060), scrolling is initiated and controlled by optical user interfacing; step 1075. At this point, process 1000 is complete.

An embodiment of the present invention, an optical sensor based user interface for a handheld device is thus described.

While the present invention has been described in particular embodiments, it should be appreciated that the present invention should not be construed as limited by such embodiments, but rather construed according to the below claims.

What is claimed is:

1. A portable electronic device comprising:
an optical unit operable to detect user interaction with said portable electronic device, wherein said optical unit comprises
an optical source; and
an optical sensor for detecting a variation in optical coupling between said optical source and said optical sensor, wherein said variation in optical coupling is in response to a user interaction with said portable electronic device; and
a processor coupled to said optical unit, wherein said processor is operable to process said detected user interaction, and wherein said user interaction is operable to control the operation of said portable electronic device, and wherein said processor is further operable to modify the operation of said optical unit in response to said detected user interaction.

2. The portable electronic device as described in claim 1, wherein said optical source is selected from a group consisting of: a light emitting diode (LED); a laser diode (LD); and a quantum dot.

3. The portable electronic device as described in claim 1, wherein said optical sensor is selected from a group consisting of: a solid state photosensitive electro-optical device; a quantum photodetector; a radiometer; and a pyroelectric detector.

4. The portable electronic device as described in claim 1, wherein said processor controls scanning between said optical source and said optical sensor at a variable rate.

5. The portable electronic device as described in claim 1, wherein said optical coupling varies in response to a user's varying touch.

6. The portable electronic device as described in claim 1 further comprising:
a display operable to display information, wherein said display is further operable to display information in response to said detected user interaction.

7. The portable electronic device as described in claim 1, wherein said optical unit comprises a surface, and wherein said optical unit is further operable to detect speed and direction of movement over said surface.

8. The portable electronic device as described in claim 7, wherein said processor in response to said optical unit detecting a first movement at a first speed performs a first display update.

9. A method of optical detection within a mobile device, said method comprising:
optically detecting a user interaction with said mobile electronic device using optical detector;
detecting speed and direction of movement over a surface of said mobile electronic device;
processing information related to said user interaction;
in response to said processing, controlling the operation of said mobile electronic device; and
in response to said processing, modifying optical characteristics for said optical detector.

10. The method as described in claim 9 wherein said optically detecting comprises:
supplying optical signals via an optical source;
receiving said optical signals via an optical sensor of said optical detector; and
determining variation in optical coupling between said optical source and said optical sensor, wherein said variation is in response to a user interaction with said mobile electronic device.

11. The method as described in claim 10 further comprising:
scanning between said optical source and said optical sensor.

12. The method as described in claim 11 further comprising: changing a rate of said scanning in response to said processing.

13. The method as described in claim 10, wherein said variation in optical coupling is in response to a user's varying touch.

14. The method as described in claim 9 further comprising:
displaying appropriate information in response to said detected user interaction.

15. A method of enabling user interaction with a portable electronic device comprising:
displaying information on a display of said portable electronic device;
optically detecting a user interaction with said portable electronic device using an optical detector, wherein said detected user interaction is operable to control the operation of said portable electronic device, wherein said detecting comprises:
supplying optical signals via an optical source;
receiving said optical signals via an optical sensor of said optical detector; and
determining variation in optical coupling between said optical source and said optical sensor, wherein said variation is responsive to a user interaction with said portable electronic device;
processing information related to said user interaction;
in response to said processing, updating information on said display of said portable electronic device; and
in response to said processing, modifying optical characteristics for said optical detector.

16. The method as described in claim 15 further comprising:
scanning between said optical source and said optical sensor.

17. The method as described in claim 16 further comprising: changing a rate of said scanning in response to said processing.

18. The method as described in claim 15, wherein said variation in optical coupling is in response to a user's varying touch.

19. The method as described in claim 15 further comprising:
detecting the speed and the direction of movement over a surface of said portable electronic device.

* * * * *